A. ALTMAN.
NEEDLE STRAIGHTENING MACHINE.
APPLICATION FILED JUNE 15, 1917.
1,361,513.                                  Patented Dec. 7, 1920.
                                                    18 SHEETS—SHEET 1.
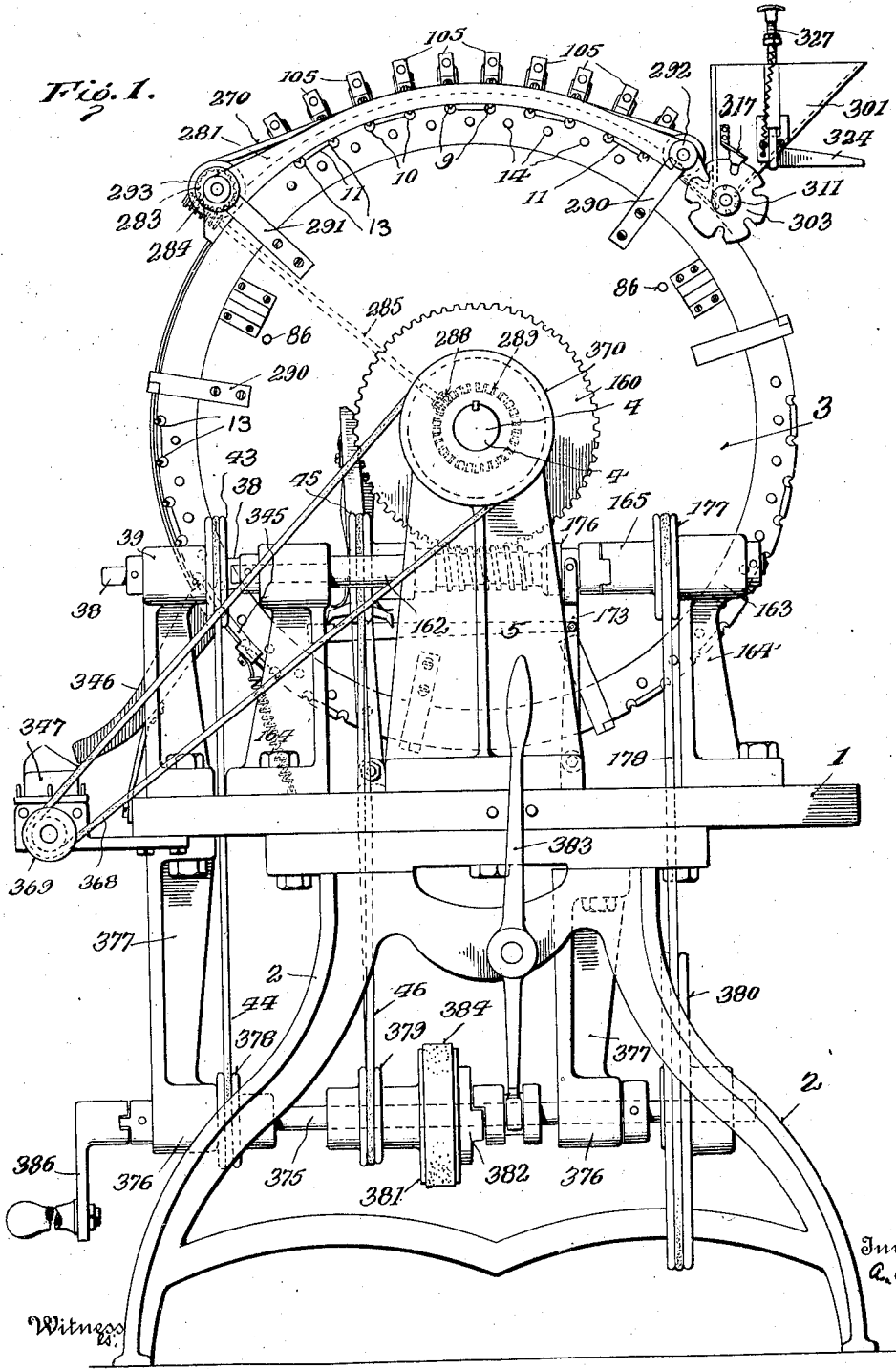

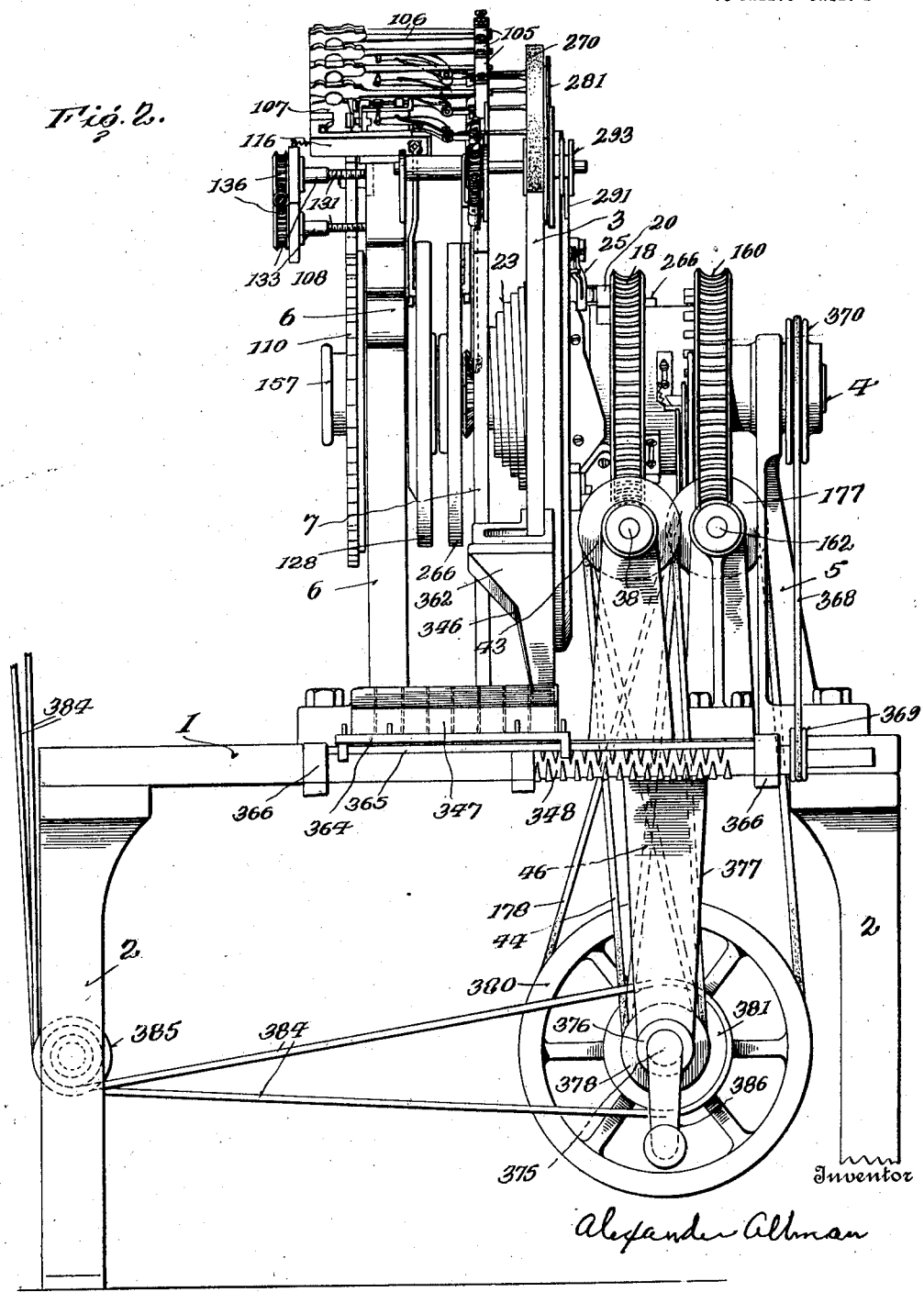

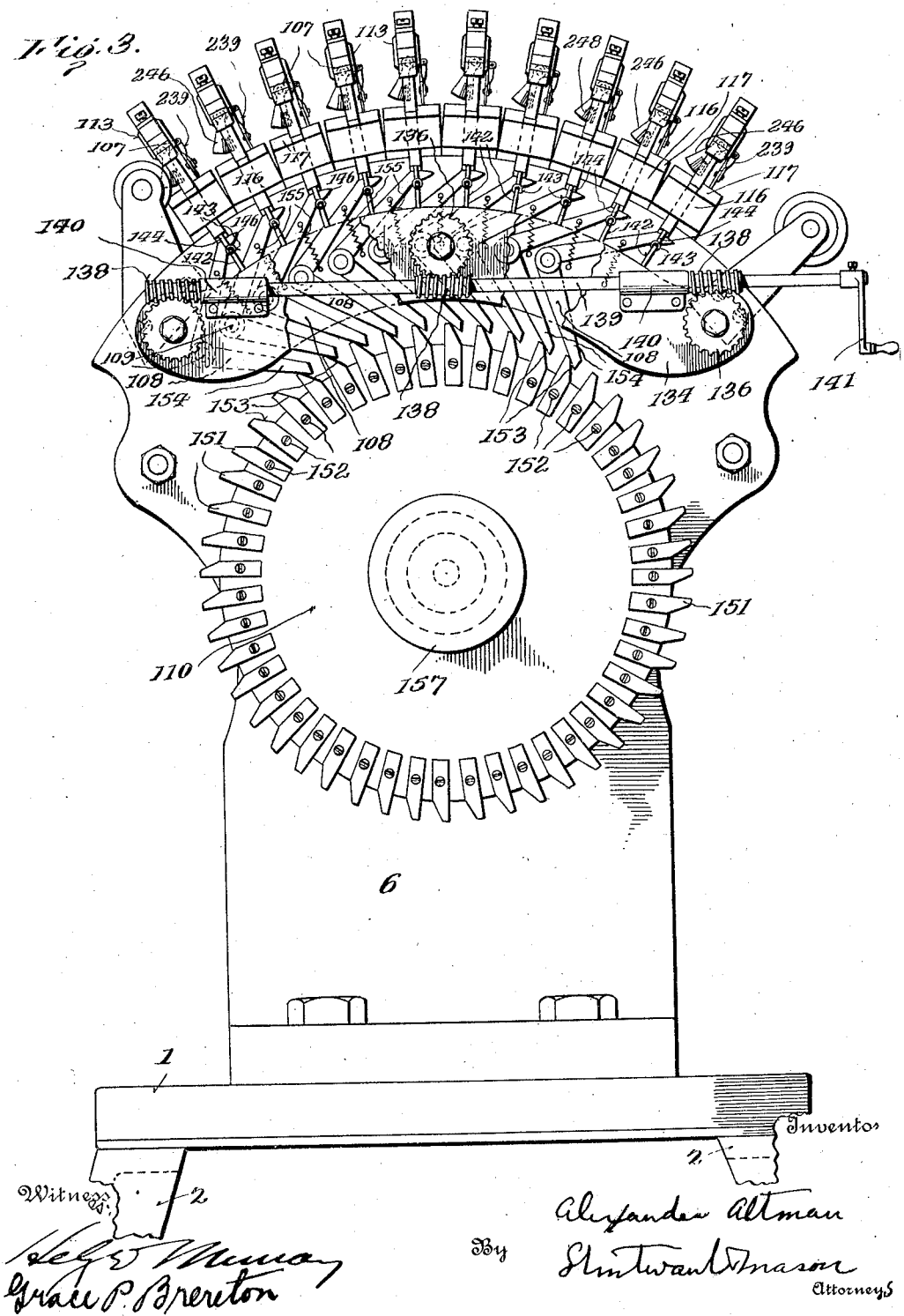

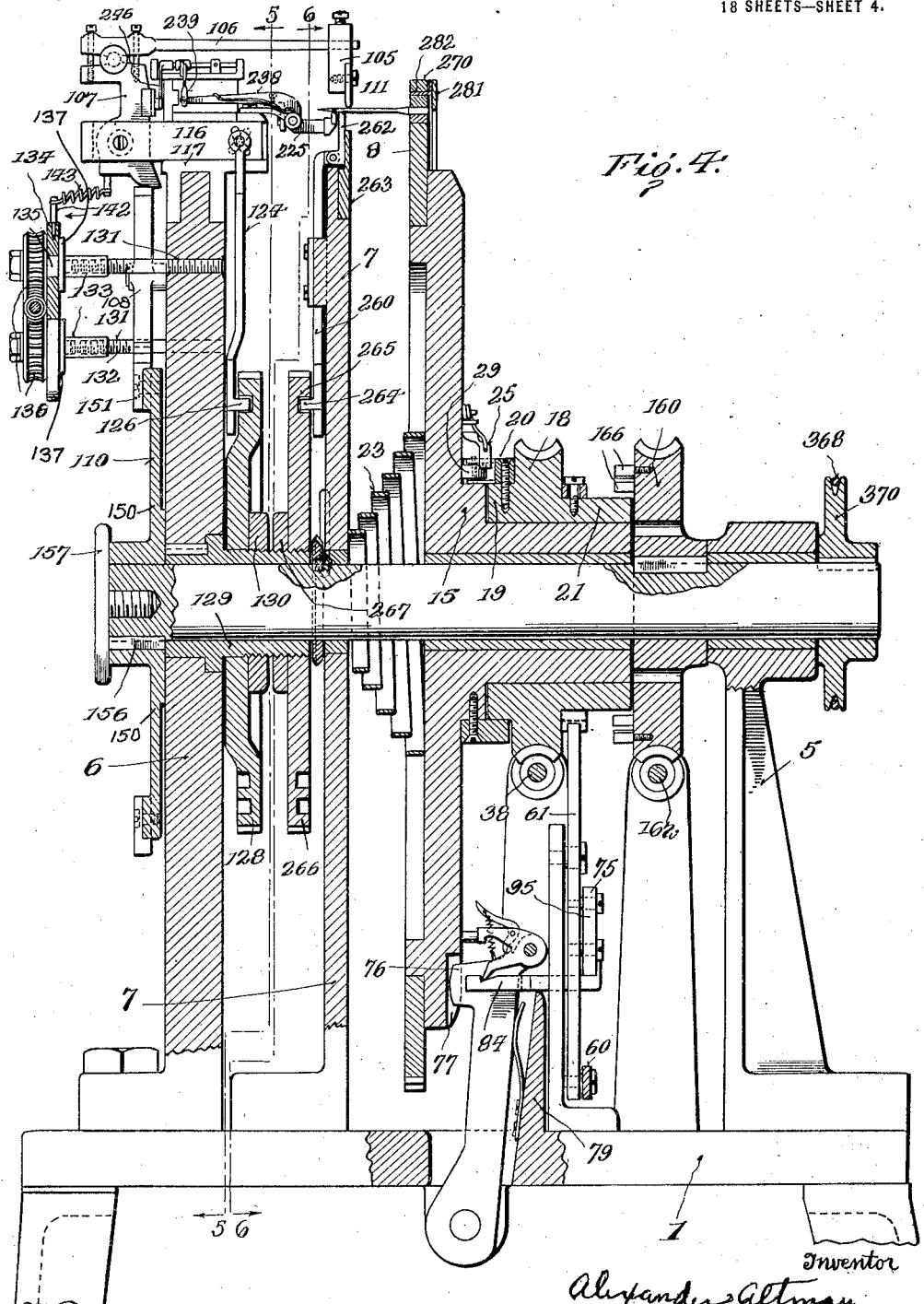

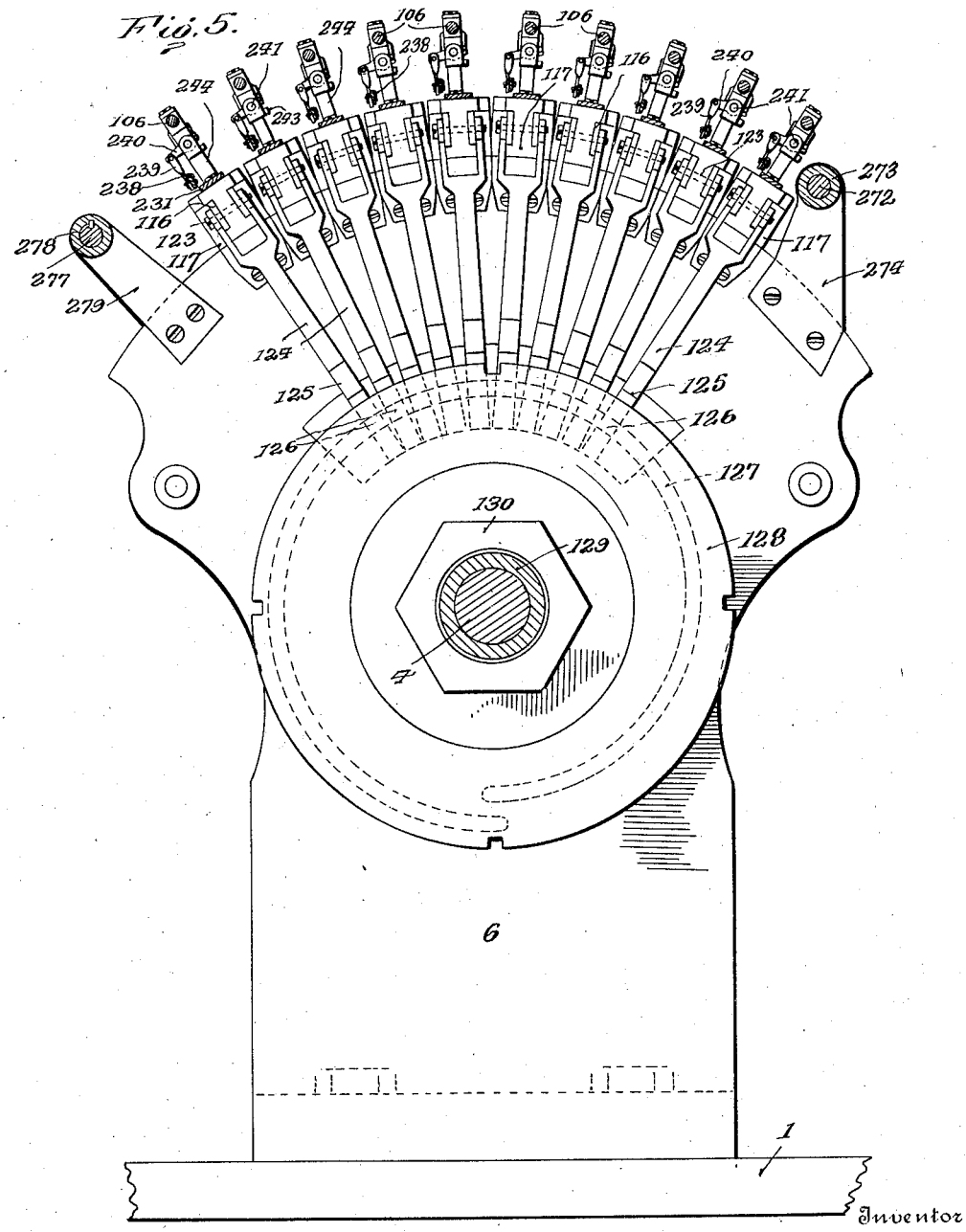

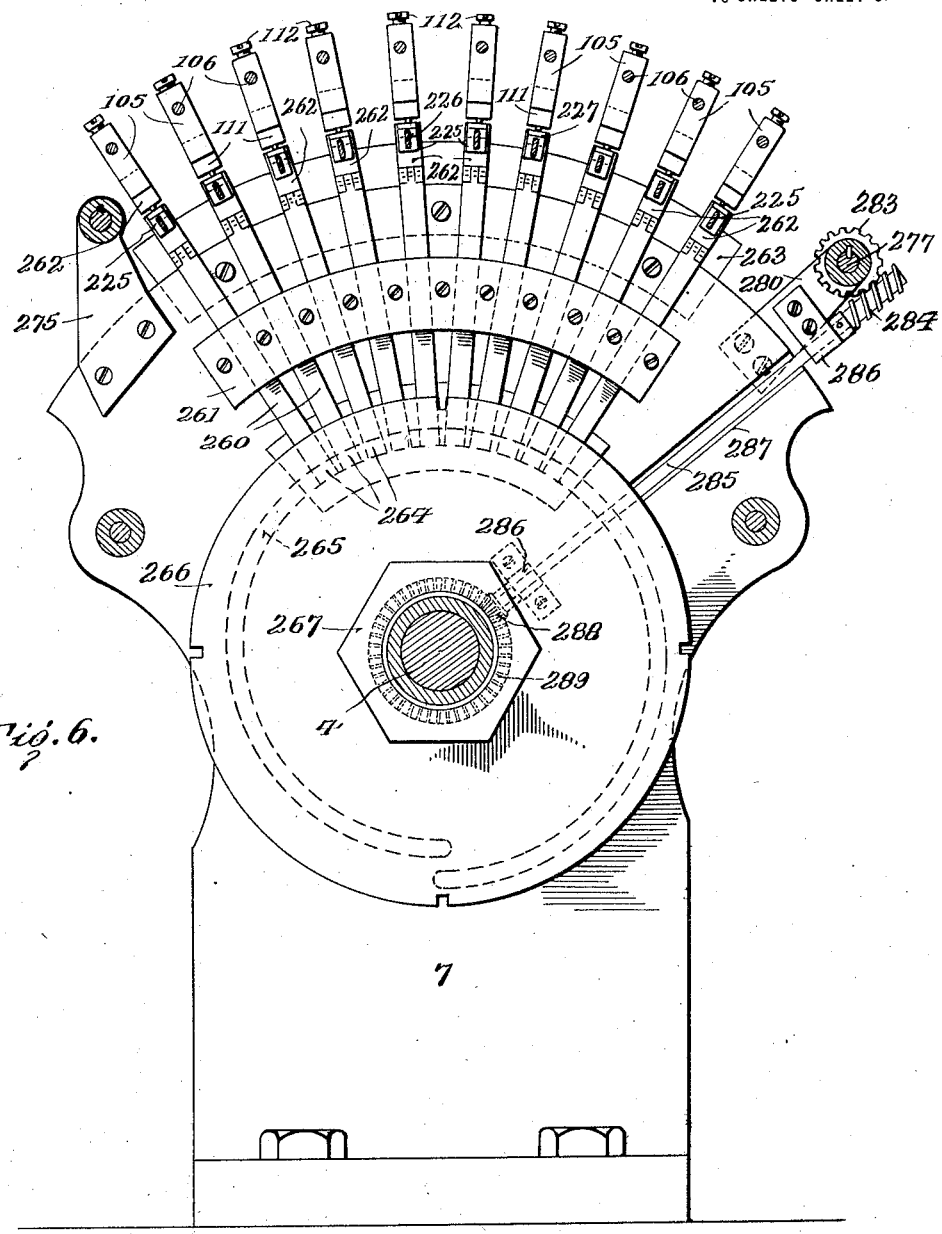

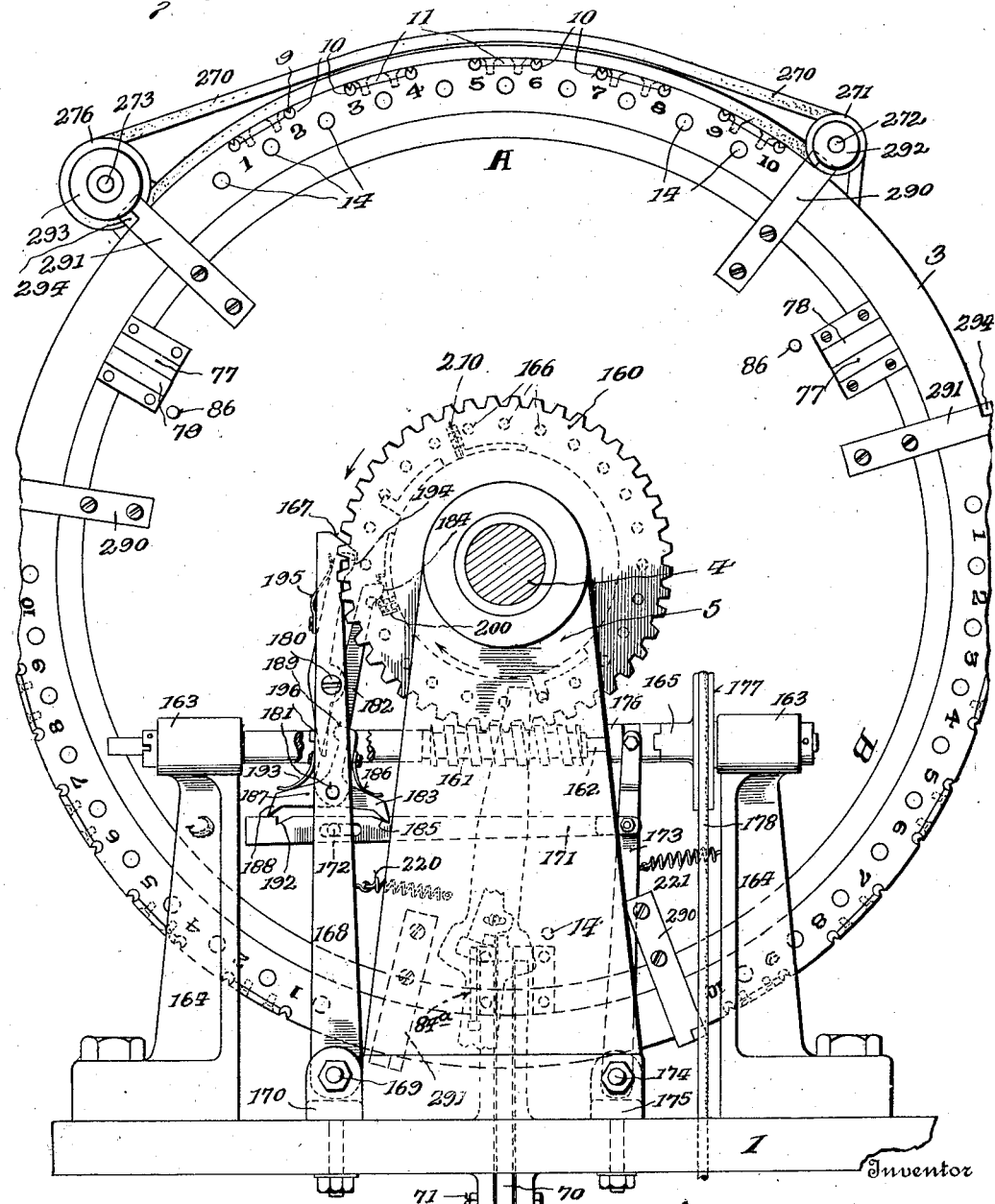

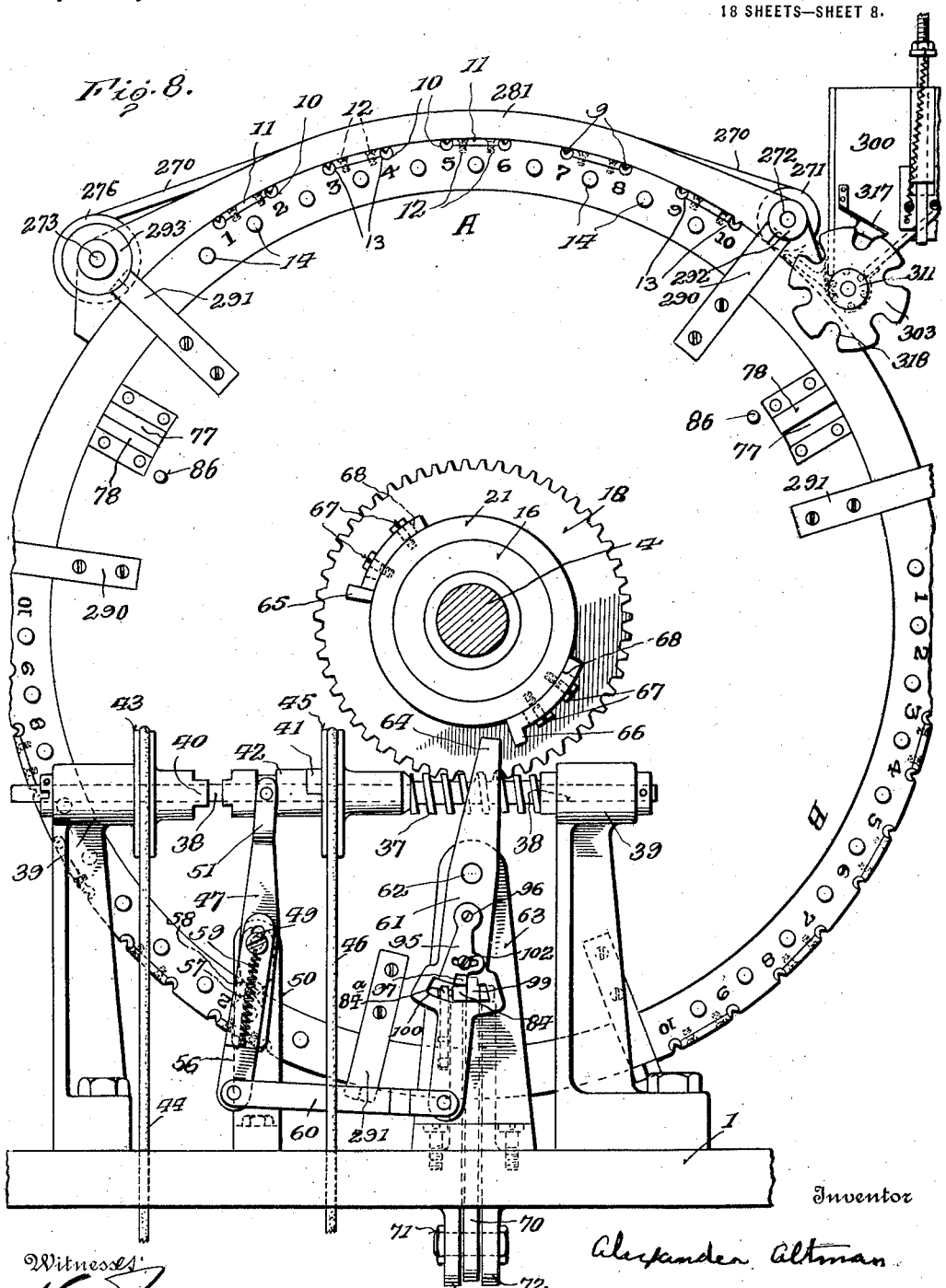

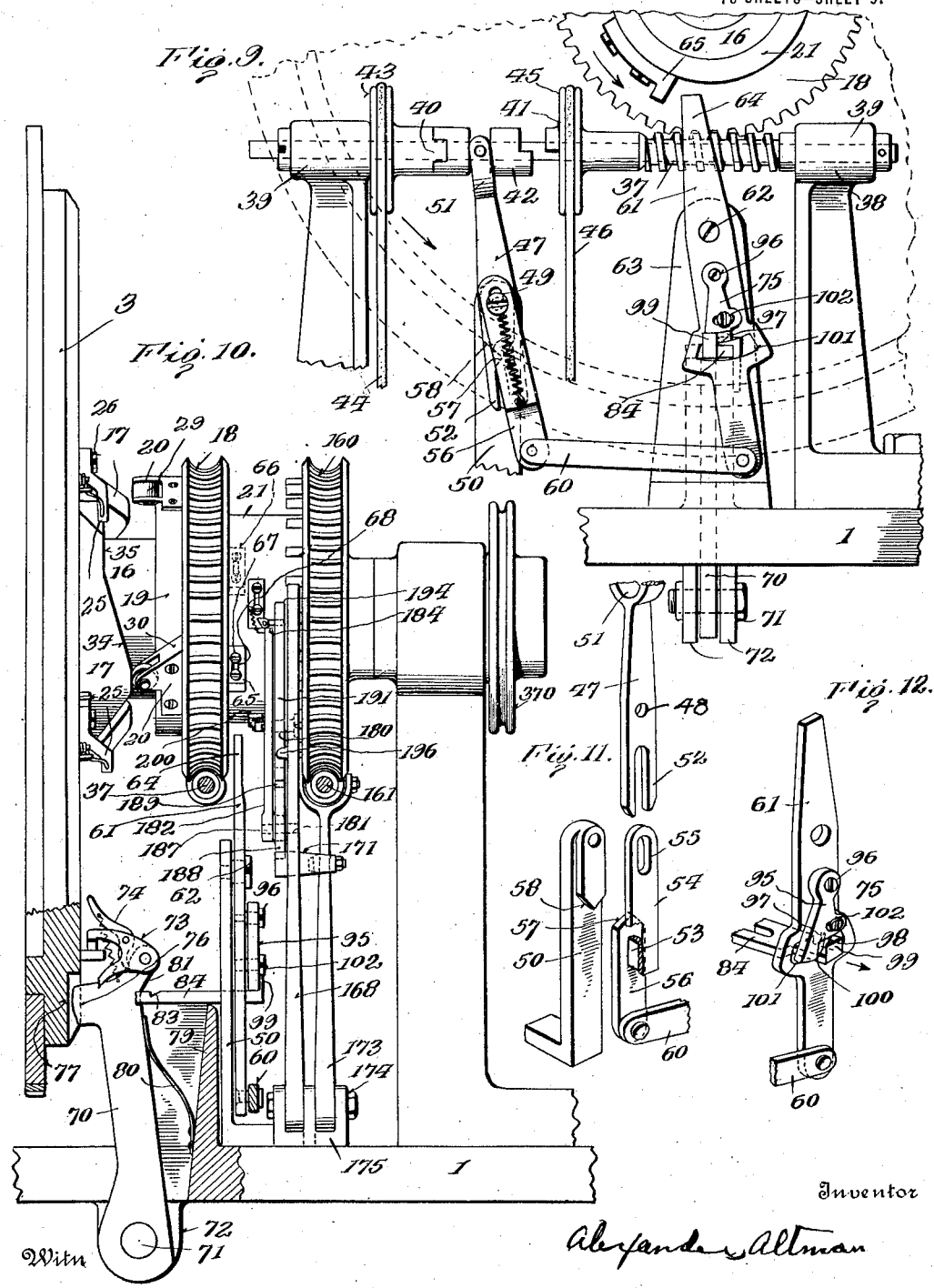

A. ALTMAN.
NEEDLE STRAIGHTENING MACHINE.
APPLICATION FILED JUNE 15, 1917.

1,361,513.

Patented Dec. 7, 1920.
18 SHEETS—SHEET 10.

A. ALTMAN.
NEEDLE STRAIGHTENING MACHINE.
APPLICATION FILED JUNE 15, 1917.
1,361,513.
Patented Dec. 7, 1920.
18 SHEETS—SHEET 11.
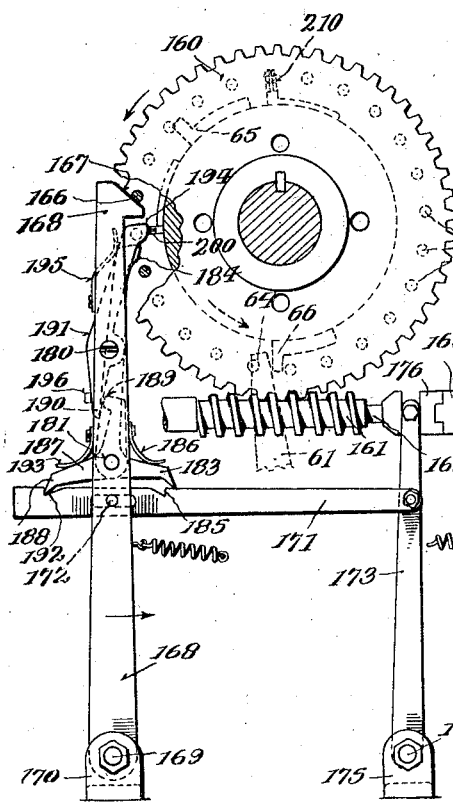
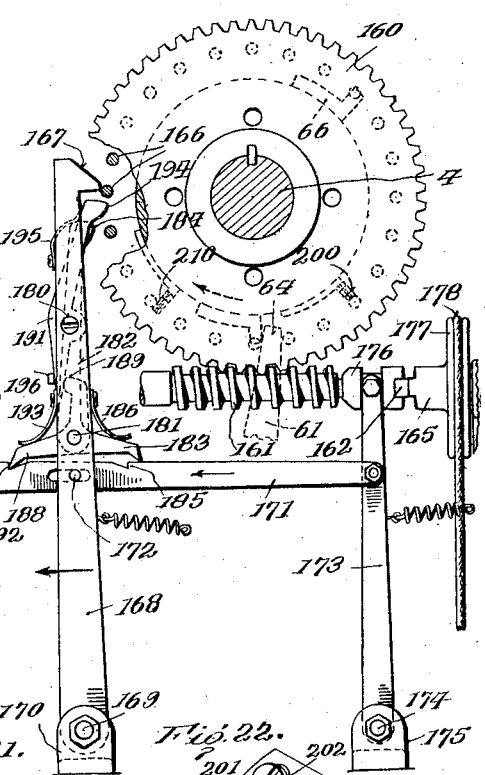
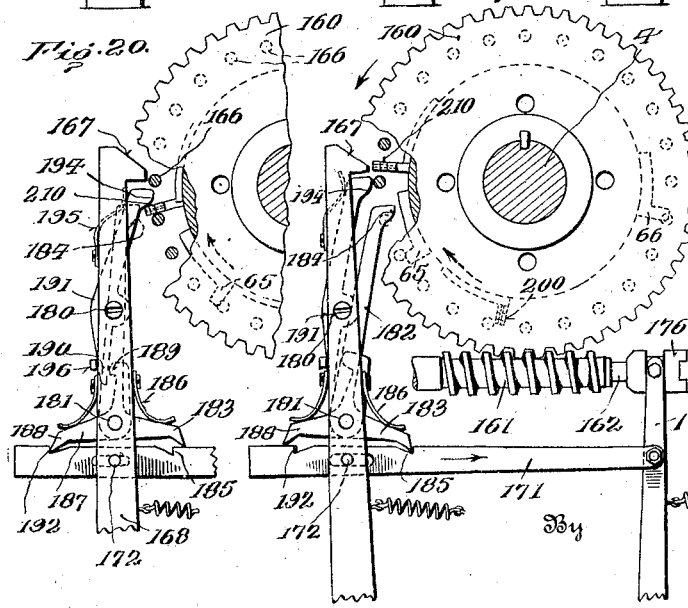
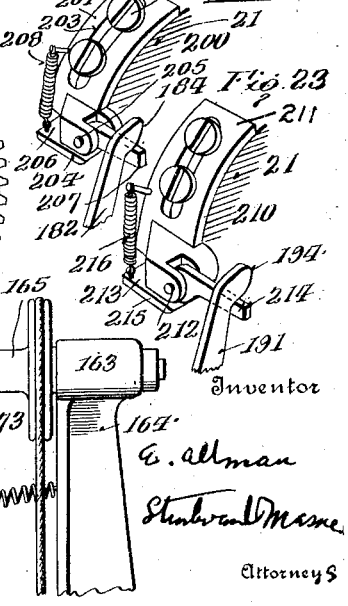

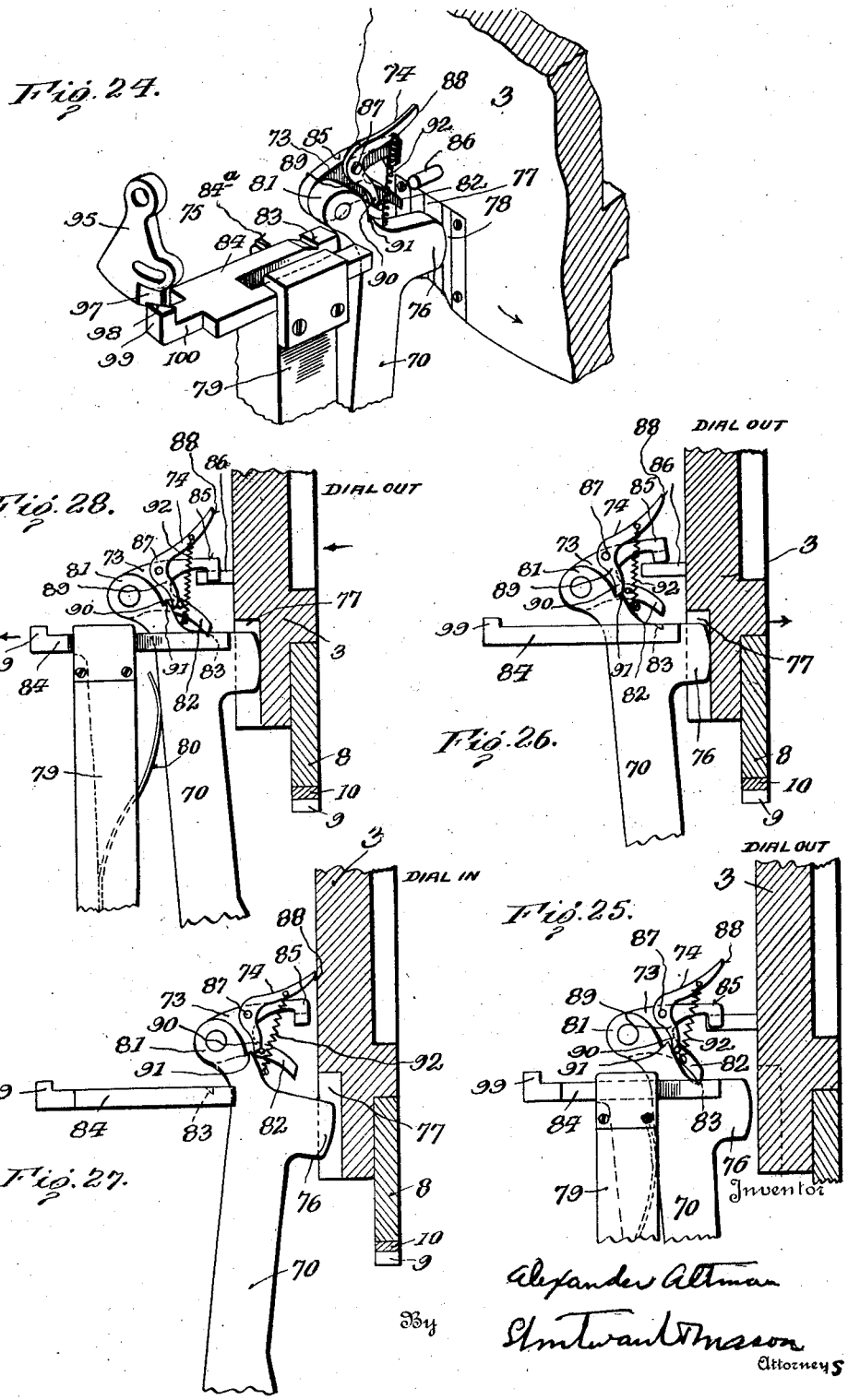

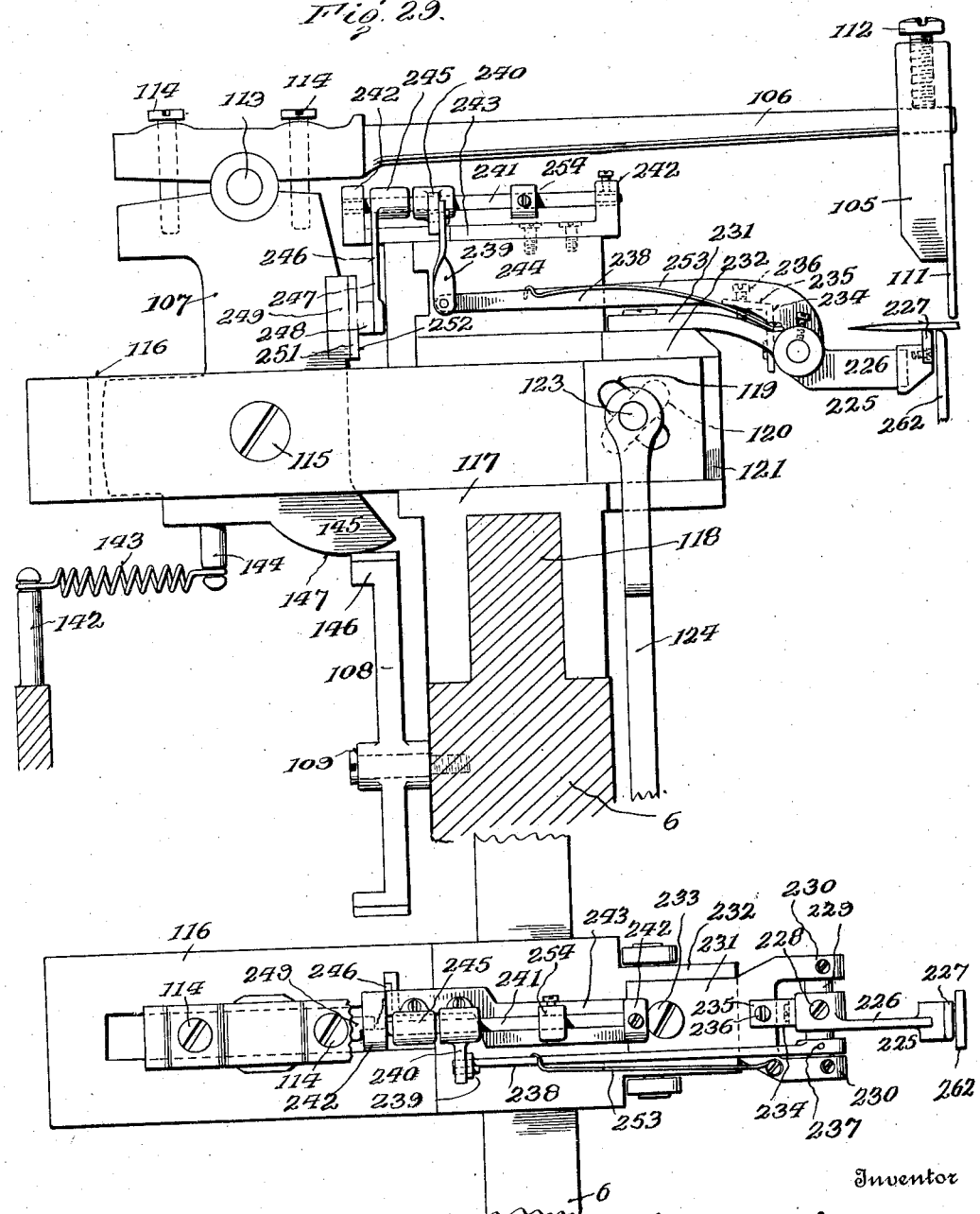

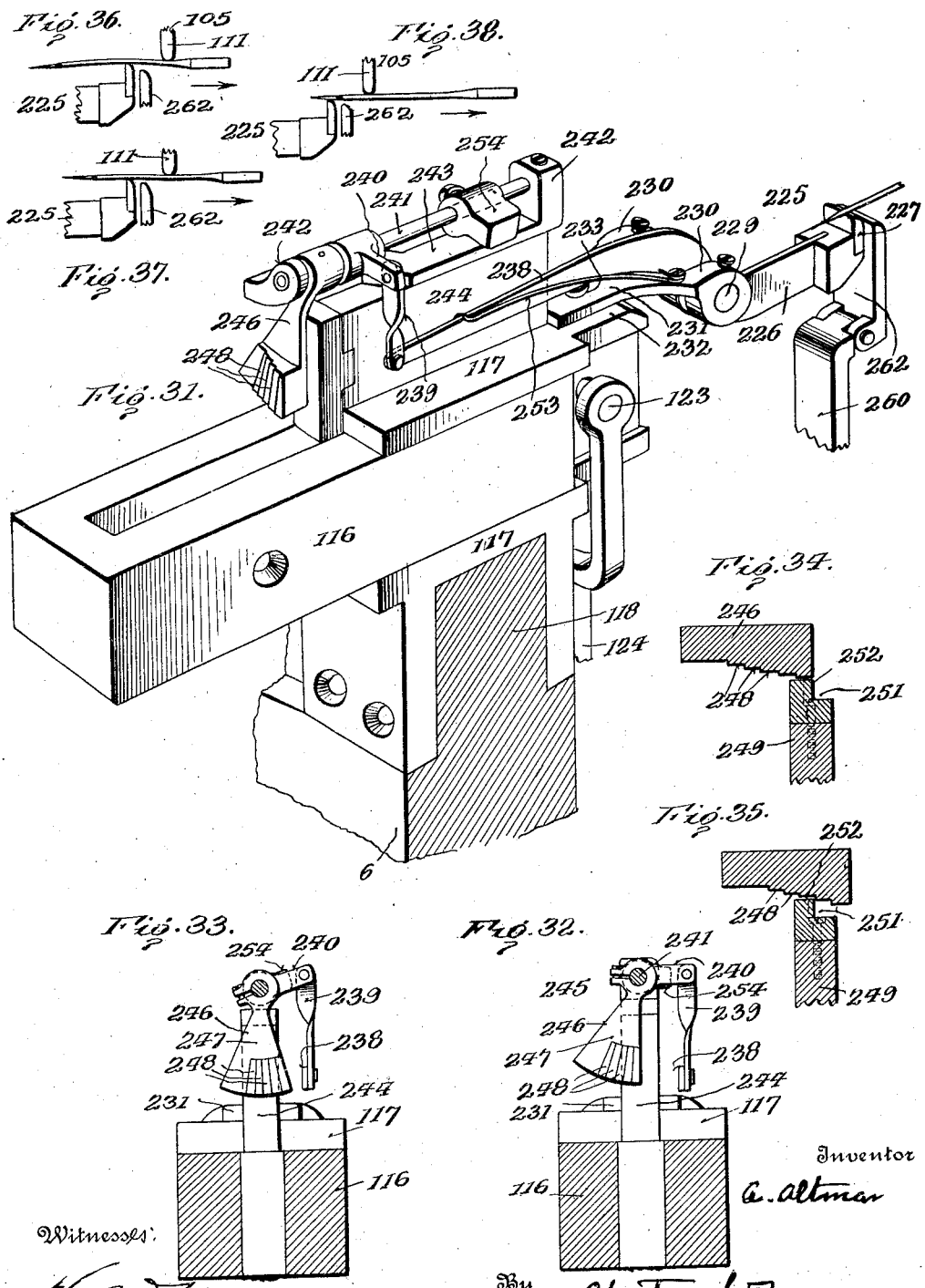

A. ALTMAN.
NEEDLE STRAIGHTENING MACHINE.
APPLICATION FILED JUNE 15, 1917.
1,361,513.
Patented Dec. 7, 1920.
18 SHEETS—SHEET 15.
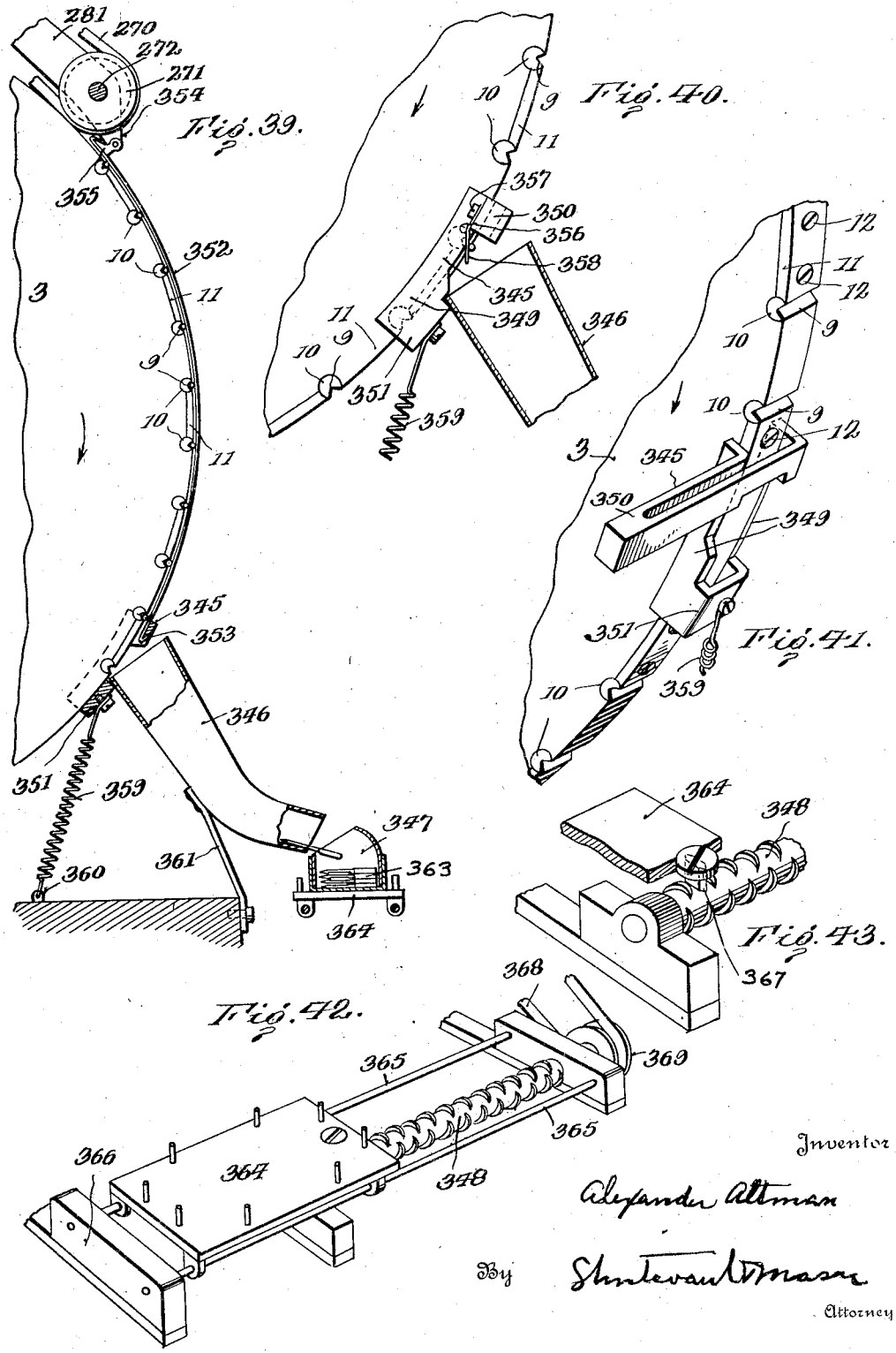

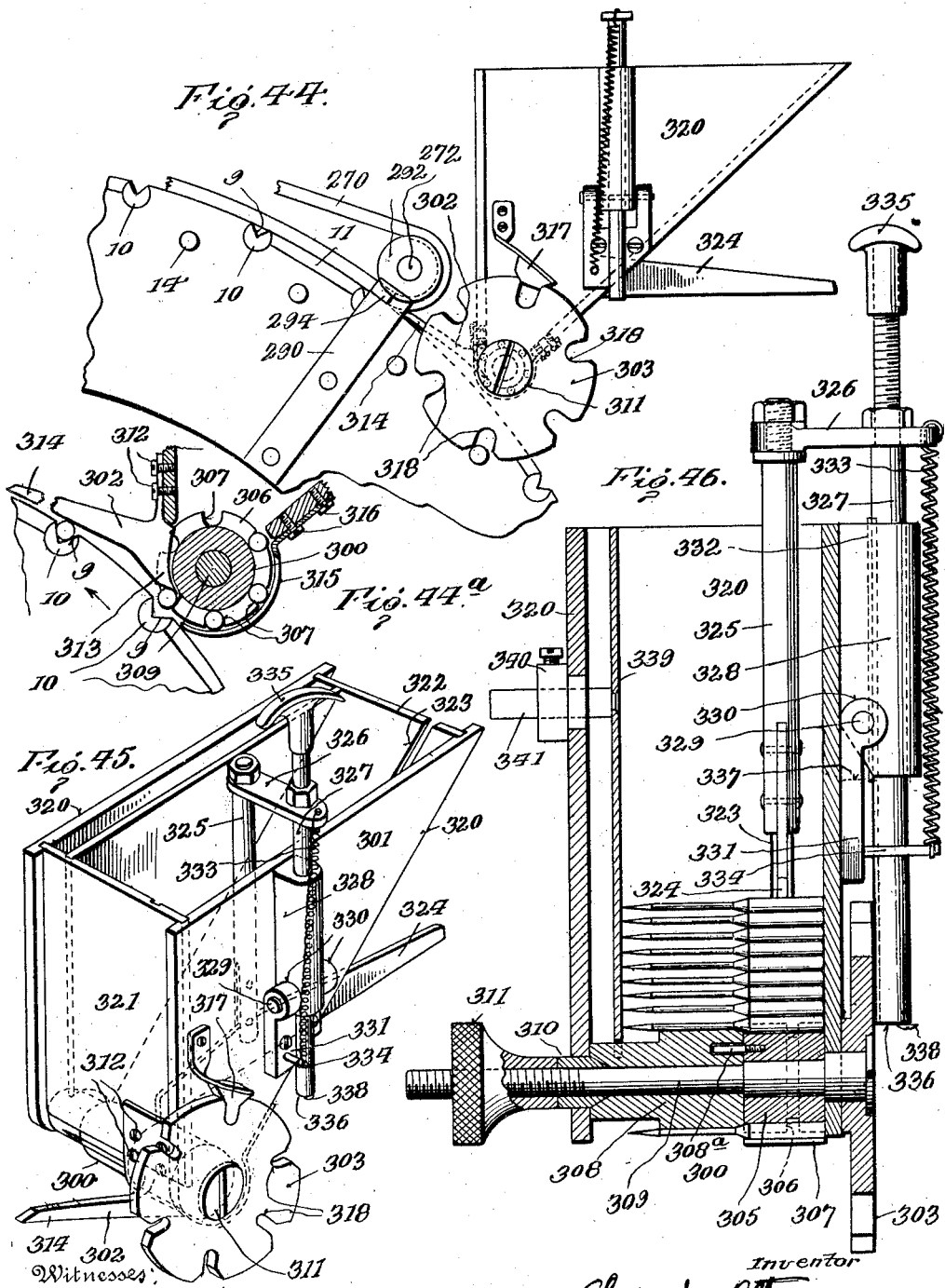

A. ALTMAN.
NEEDLE STRAIGHTENING MACHINE.
APPLICATION FILED JUNE 15, 1917.
1,361,513.
Patented Dec. 7, 1920.
18 SHEETS—SHEET 17.
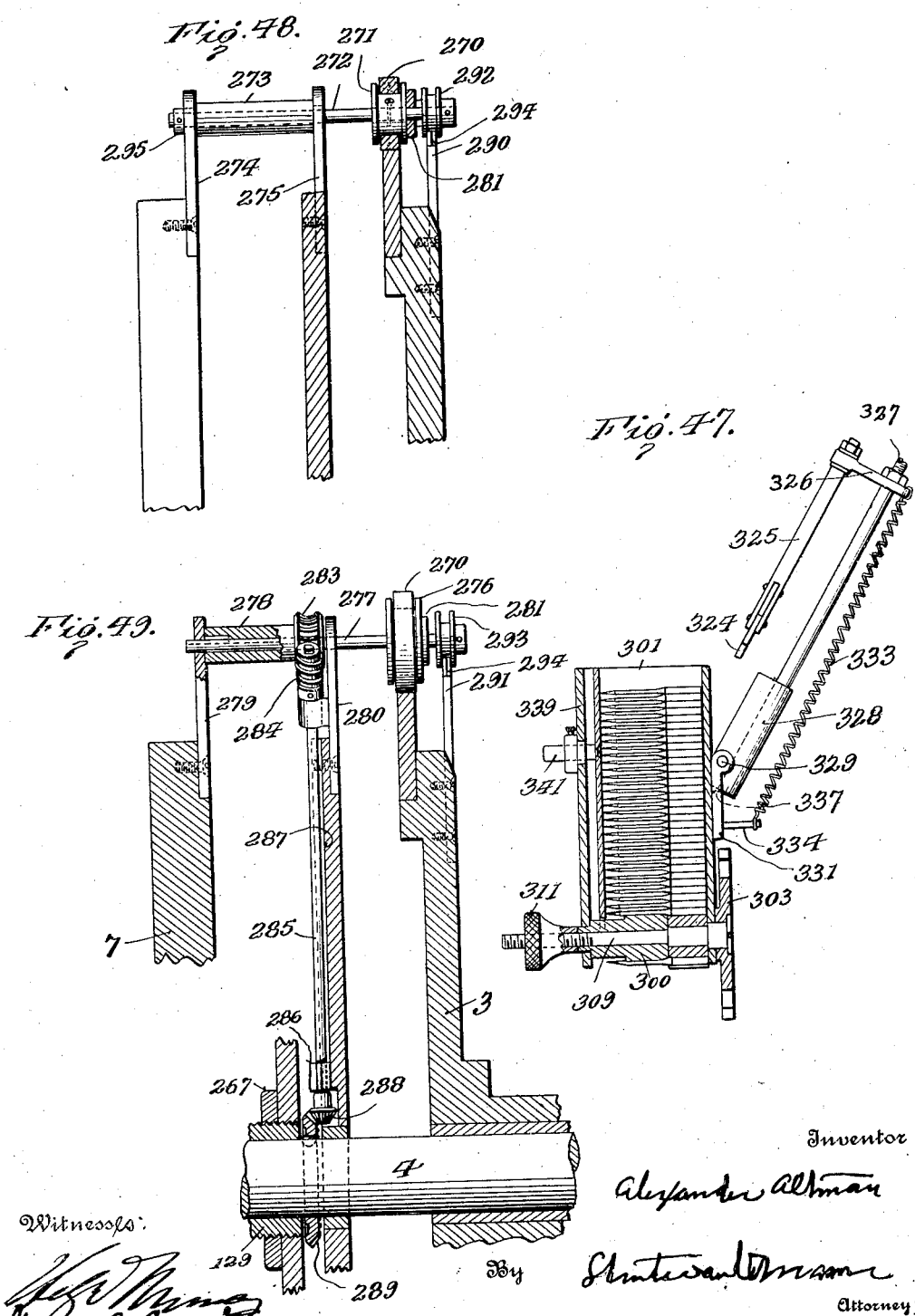

A. ALTMAN.
NEEDLE STRAIGHTENING MACHINE.
APPLICATION FILED JUNE 15, 1917.
1,361,513.
Patented Dec. 7, 1920.
18 SHEETS—SHEET 18.
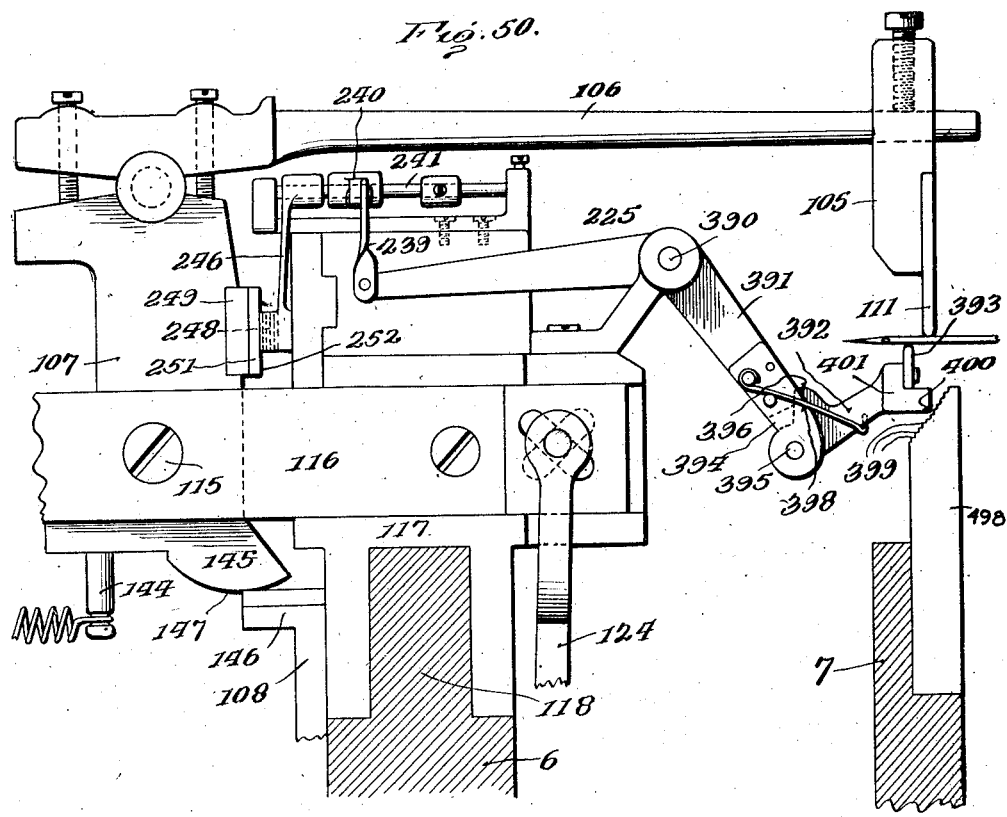
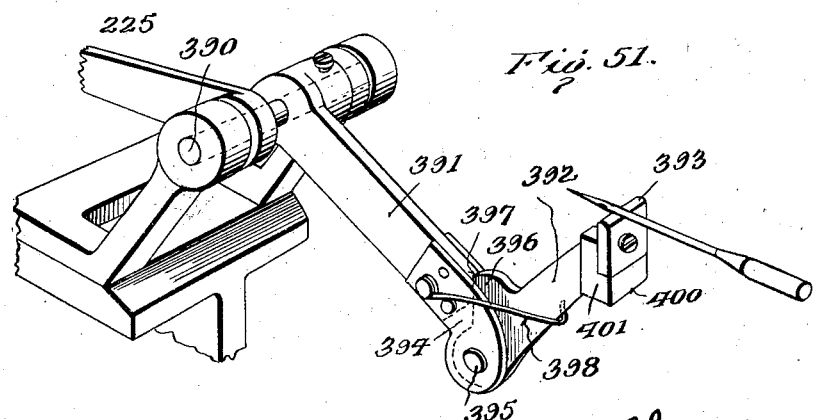

UNITED STATES PATENT OFFICE.

ALEXANDER ALTMAN, OF TORRINGTON, CONNECTICUT, ASSIGNOR, BY MESNE ASSIGNMENTS, TO THE TORRINGTON COMPANY, OF TORRINGTON, CONNECTICUT, A CORPORATION OF CONNECTICUT.

NEEDLE-STRAIGHTENING MACHINE.

1,361,513.  Specification of Letters Patent.  Patented Dec. 7, 1920.

Application filed June 15, 1917. Serial No. 174,936.

*To all whom it may concern:*

Be it known that I, ALEXANDER ALTMAN, a subject of the Emperor of Austria-Hungary, residing at Torrington, in the county of Litchfield, State of Connecticut, have invented certain new and useful Improvements in Needle-Straightening Machines, of which the following is a description, reference being had to the accompanying drawing, and to the figures of reference marked thereon.

This invention relates to certain new and useful improvements in needle straightening machines and contemplates more especially an automatic mechanism for removing the curves or "crooks" in needles used for high speed sewing machine work.

The "crooks" in a needle usually result from the tempering process to which the needle is subjected, and before the needle can be successfully used in connection with high speed sewing machines, it must be straightened.

At the present time needles are generally straightened by hand. Although there are machines in use for such purpose, I have endeavored to produce a novel machine for this purpose which is comparatively simple, entirely automatic, and which produces commercial needles with speed, thereby largely increasing the output.

The herein-described invention has been designed to overcome the difficulties now experienced and to provide a machine capable of producing a high grade of work, and at the same time commercially successful in the trade.

An object of the invention is the production of a needle-straightening machine including in combination means for straightening a plurality of needles simultaneously; a feeding mechanism for delivering the needles to be straightened in consecutive groups; and needle-discharging means for collecting the straightened needles.

Another object of this invention is to produce a needle-straightening machine including in combination a movable needle support designed to convey the needles in groups to the straightening devices, means for intermittently moving the needle support, locking mechanism for holding the needle support while the needles are being straightened, and interconnected actuating mechanism including clutches for operating the means which intermittently moves the needle support.

Another object of this invention is the production of a needle-straightening machine including in combination a movable needle support designed to receive the needles in predetermined groups, needle-straightening devices, including a plurality of hammers, means including interconnected levers for controlling the operation of the hammers, needle-crook-detecting mechanism associated with each hammer for determining the strength of the blow to be given the needle by the hammer, and means for adjusting the straightening devices and the needle-crook-detecting mechanism.

A further object of the invention is to produce a needle-straightening machine including in combination a needle support for receiving predetermined groups of needles, needle-straightening devices including a plurality of hammers, and relatively positioned block members upon which the needles are straightened, needle-crook-detecting mechanism connected with each hammer, consisting of a positive selective blow device for determining the strength of the blow of the hammer as compared with the crook in the needle, and means for continuously revolving the needles while being straightened.

With these and other objects in view, the invention consists in the combination, arrangement and adjustment of the several mechanisms hereinafter described and pointed out in the appended claims.

In the drawings, which show an embodiment of my invention as designed to operate upon round shank needles,—

Figure 1 is a front view of my improved needle-straightening machine;

Fig. 2 is a side view thereof;

Fig. 3 is a rear view of the machine with parts broken away;

Fig. 4 is a vertical longitudinal sectional view through the machine;

Fig. 5 is a vertical transverse sectional view on the line 5—5 of Fig. 4;

Fig. 6 is a similar view to Fig. 5 on the line 6—6 of Fig. 4;

Fig. 7 is an enlarged fragmentary front view illustrating the relative position of the needle-supporting dial and associated levers and mechanisms for operating the clutch which controls the blow wheel, the needle guard and retaining band being removed;

Fig. 8 is an enlarged front elevation of the dial, showing the actuating mechanism including the clutches which are alternately engaged for intermittently operating the needle support;

Fig. 9 is a similar fragmentary view, showing the clutch-actuating mechanism with the opposite clutch engaged to that shown in Fig. 8, and the interconnected locking means;

Fig. 10 is a fragmentary side elevation of one end of the machine, illustrating the needle-supporting dial, the locking means for the dial while the needles are being straightened, and the interconnected levers for controlling the operation of the blow wheel which operates the hammers;

Fig. 11 is a detached perspective view of the levers for alternating the clutch engagement for intermittently operating the needle support;

Fig. 12 is a detached perspective view of the levers for withdrawing the lock from the needle-supporting dial;

Fig. 18 is a detail view of the means for controlling the operation of the hammers, the said means including a plurality of interconnected levers and tripping devices, the position of which is herein illustrated with the clutch engaged and the levers set for the withdrawal of the clutch;

Fig. 19 is a similar view to Fig. 18, showing the position of the levers and the clutch disengaged;

Fig. 20 is a view similar to Fig. 19, showing the tripping device ready to engage one of the levers for allowing the clutch to become engaged;

Fig. 21 is a similar view, showing the clutch engaged and the relative position of the tripping devices and levers;

Fig. 22 is a detached perspective view of one of the tripping latches for operating upon one of the levers;

Fig. 23 is a detached perspective view of the other tripping latch for operating upon another lever;

Fig. 24 is a detached perspective view of the locking means for holding the dial while the needles are being straightened;

Fig. 25 is a view showing the locking lever withdrawn while the needle-supporting dial is being rotated;

Fig. 26 is a view showing the locking device lever released and in engagement with the needle-supporting dial which is ready to be moved inwardly;

Fig. 27 is a view similar to Fig. 26, with the locking lever engaged and the dial moved in, in the direction of the arrow, the retaining pawl for said lever being shown clear of the notch into which it falls when the locking lever is held out;

Fig. 28 is a similar view, showing the locking lever engaged and the needle-supporting dial moved out in the direction of the arrow;

Fig. 29 is an enlarged sectional side elevation of one of the hammers and associated needle-crook-detecting mechanism;

Fig. 30 is a plan view thereof;

Fig. 31 is a perspective view of the needle-crook-detecting mechanism;

Fig. 32 is a detail view of the positive selection blow device for determining the strength of the blow of the hammer as compared with the crook in the needle;

Fig. 33 is a similar view to Fig. 32, showing the selection blow device in a position indicating a different degree of blow to be given the hammer;

Fig. 34 is a detail sectional view of the positive selective blow device and the co-acting blow member carried by the hammer;

Fig. 35 is a similar view to Fig. 34, illustrating a different position;

Figs. 36, 37 and 38 are diagrammatic views, showing the relative positions of the hammer, needle-crook-detecting finger, and the block member upon which the needle is straightened, the positions in each figure illustrating the path of movement of the needle as it is drawn beneath the straightening hammer in the direction of the arrow;

Fig. 39 is a detail sectional view of the needle-discharging means;

Fig. 40 is a detail elevation of the needle block and ejecting spring for ejecting the straightened needles into the chute leading to the receiving needle pan;

Fig. 41 is a detail perspective view of the needle block or yoke which straddles the needle-supporting dial and is yieldingly held with relation thereto;

Fig. 42 is a perspective view of the movable slide which holds the needle pan;

Fig. 43 is a detail perspective view of the lug which alternately engages a double worm for reciprocating the slide carrying the needle pan;

Fig. 44 is an enlarged sectional elevation of the feeding mechanism and hopper for delivering the needles to the needle-supporting dial;

Figure 13:
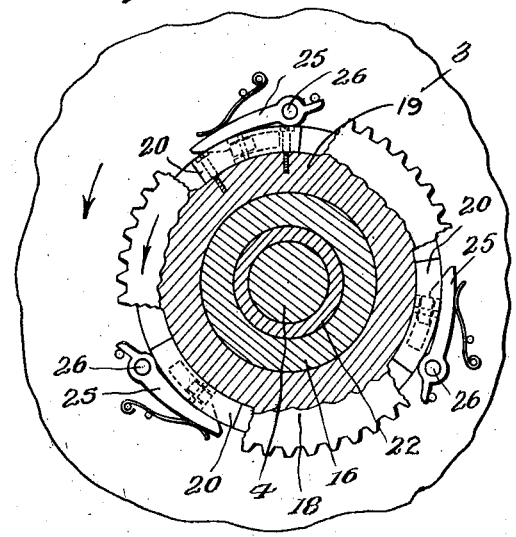
Fig. 13 is a detail sectional view of the pawl and ratchet mechanism for intermittently rotating the needle-supporting dial, showing the pawls engaged and the dial being rotated in the direction of the arrow.

Fig. 44ª is a detail sectional view through the lower corner of the needle hopper and needle-delivering drum;

Fig. 45 is a detached perspective view of the needle hopper;

Fig. 46 is an enlarged sectional view through the needle hopper;

Fig. 47 is a similar view, showing the follower which normally bears upon the needles in the hopper withdrawn while the hopper is being re-filled with needles to be straightened;

Fig. 48 is a detail sectional view of the revolving means for rotating the needles while being straightened;

Fig. 49 is a similar view of the driving mechanism for revolving the means which rotates the needles;

Fig. 50 is a detail side view of a modified form of associated hammer, needle-crook-detecting device and coöperating blow-receiving member; and Fig. 51 is a detached perspective view of the form of needle-crook-detecting device shown in Fig. 50.

The present invention has been primarily designed for use in straightening round-shank needles, as distinguished from flat-shank needles, and comprises among other things a movable needle support arranged to receive and retain the needles in predetermined groups indicated at A, B and C on the face of the needle support; a plurality of needle-straightening devices corresponding to the number of needles in each group; needle-crook-detecting mechanism associated with each straightening device for determining the strength of the blow to be given in straightening the needle; relatively positioned block members upon which the needles are straightened, corresponding in number to the needles in the group; feeding means for delivering a plurality of needles to the movable needle support to form the predetermined group to be straightened simultaneously; and a discharging or needle-ejecting device for removing the needles from the movable support after straightening, and conveying them to the needle-receiving pan.

The movable needle support which receives the needles from the feeding device and retains them until after the straightening operation, comprises a dial designed to be intermittently rotated while the needles are being fed thereto and the group of needles which has been straightened conveyed to the ejecting mechanism; and it is subsequently reciprocated longitudinally of the machine while locked against rotation when the needles are being straightened.

Coöperating with the periphery of the dial adjacent the needle-straightening device is a revolving means comprising an endless band designed to be driven over the shanks of the needles during the straightening operation. This mechanism reciprocates with the dial, as will more fully hereinafter appear.

The needle-straightening devices, as shown in the drawings, are ten in number and comprise as many independently operated hammers; an intermittently rotated blow wheel for operating the hammers, and interconnected levers and tripping latches for controlling the intermittent movement of the blow wheel. The ten hammers are operated simultaneously upon a group of ten needles while the dial is being reciprocated in what will be termed an outward direction. The relative strength of the blow of each hammer is determined by the needle-crook detecting device which is coöperatively associated with each hammer.

Each needle-crook-detecting device is provided with a highly sensitive finger which is designed to contact with the blade of the needle beneath and to one side of the hammer. All variations, curves or crooks in the needle are readily detected by this finger which is interconnected with a positive selective blow device movable with relation to the hammers, thereby determining the position of the selective blow device for giving to the needle light or heavy blows, depending upon the degree of the crook in the needle.

Referring to the diagrammatic views, Figs. 36, 37 and 38, the needles are straightened as the dial reciprocates outwardly in the direction of the arrow, and as the sensitive finger is designed to remain in contact with the blade which is being revolved, all crooks are hammered out by the time the dial has reached its outermost position.

Coöperating with the straightening and crook-detecting devices are the relatively positioned block members upon which the needles are straightened. These members when adjusted remain fixed with relation to the hammers and sensitive fingers, and are designed to receive the impact from the hammers as transmitted to the needles. Each block member is located beneath a hammer and in close proximity to the sensitive finger.

Referring to the drawings, in which similar reference characters designate corresponding parts, the machine consists of a bed or base 1, suitably supported at a convenient height upon legs 2.

The needle-supporting dial 3 is rotatably and reciprocally mounted upon the shaft 4 journaled in bearings provided in a bearing standard 5 and spaced supporting standards 6 and 7. The standards are preferably bolted to the base 1, and constitute the principal supporting means for the mechanisms to be hereinafter described.

The supporting standard 6 is arcuately formed on the top surface and has secured thereto the several needle-straightening and crook-detecting devices, the blow-imparting levers and the associated adjusting devices as will more fully hereinafter appear. The supporting standard 7 is located intermediate to dial 3 and the standard 6, and relatively positions the block members upon which the needles are straightened.

Needle-supporting dial.

The dial 3 consists of an outer ring section 8 suitably secured to the body portion of the dial. Formed in the periphery of the section 8 at predetermined spaced stations are a plurality of needle-retaining seats or V-shaped grooves 9. These retaining seats are preferably provided in cylindrically shaped members 10, positioned and held in the ring section 8 by spanning plates 11 secured to the said ring section by the screws 12. The ends of the plates 11 are slightly curved, as at 13, to engage a portion of the curved surface of the cylindrically shaped members 10 and retain the latter in position. As shown in the drawings, there are three groups, A, B and C, of ten needle-retaining seats each, formed in the dial and into which the major portion of the shank of the needle rests. The remaining portion of the shank of the needle which does not seat within the V-shaped groove 9 protrudes sufficiently beyond the periphery of the dial to contact with the band used to revolve the needles in the V-shaped grooves while being straightened.

Protruding from the dial on the ring section 8 is a series of pins 14 designed to operate the needle-feeding means for delivering the needles to the dials, to be hereinafter described. These pins are arranged in proximity to the three groups of retaining seats and correspond in number to the number of needles fed to each group. Other mechanisms and markings are provided on the dial, and will be hereinafter referred to.

The dial 3 and more especially the main body portion, is provided with stepped hub sections 15 and 16, the former of which supports a series of cams 17 for controlling the reciprocation of the dial, and the latter of which supports a reversing gear 18 having a hub section 19, to which is secured a series of roller mechanisms 20 designed to coöperate with the cams 17, (see Figs. 4, 10, 15, 16 and 17).

The reversing gear is also provided with another hub section 21, to which is adjustably fastened reversing devices and tripping latches to be hereinafter described.

A bushing 22 extends through the hub sections of the dial and fits around the shaft 4.

Interposed between the face of the dial opposite the extending hub sections 15 and 16 and the supporting standard 7, is a spring 23, the purpose of which is to insure the return movement of the dial in a direction opposite to the movement thereof given through the action of the cams 17 and roller mechanism 20. The spring is of spiral design and collapses so as to permit the dial 3 to move in close proximity to the supporting standard 7.

Dial rotating and reciprocating mechanism.

Referring to Figs. 2, 4, 10 and 13 to 17 inclusive, the means for rotating the needle-supporting dial and the means for reciprocating the said dial will now be described.

Figure 15:
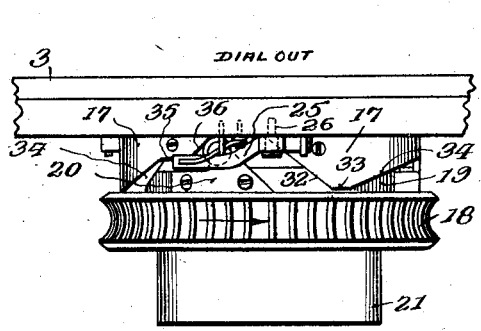
Fig. 15 is a plan view of Fig. 13, showing the needle-supporting dial in its outermost position.

The mechanism for rotating the dial intermittently to convey the needles to the straightening devices and to deliver them to the ejecting means after being straightened, comprises a series of spring-pressed pawls 25 pivoted at 26 to the dial 3. As shown in Figs. 13 and 15, the pawls 25 are designed to engage the offset edges of the roller mechanisms 20, whereupon when the reversing gear is moved in the direction of the arrow in Fig. 13, the dial will be rotated. The three roller mechanisms 20 are secured by screws to the hub section 19 of the reversing gear, and include a body portion 27 having a bifurcated end 28 in which is mounted the roller 29. The body portion 27 is provided with a sloping edge 30 and a lateral straight edge 31, against which the pawls 25 engage.

The rollers 29 are designed to operate on the cams 17 secured to the hub section 15 of the dial 3. The three cams 17 are equally spaced about the said dial hub, and comprise each a relatively steep course or surface 32, against which the roller 29 bears for forcing the dial inwardly against the tension of the spring 23; a short dwell course or high point of the cam 33; a slanting course or surface 34 against which the roller bears when the dial is moved outwardly under the action of the spring 23; a short dwell course or surface 35 for momentarily stopping the outward movement of the dial just prior to its outermost position; and a slanting course or surface 36 leading to the flat side of the dial for permitting the dial to move into the outermost reciprocatory position.

While the rollers are bearing on the cam course 34, during which time the dial is moving outwardly, the needles are being straightened.

The coöperating movements of the dial-rotating and reciprocating mechanisms are as follows: When the reversing gear 18 is moving in the direction of the arrow shown in Fig. 13 of the drawings, with the pawls 25 engaging the straight edges 31 formed on the roller-supporting members, the dial will be moved in the direction of the arrow, (indicated on the dial 3) in Fig. 13, thereby permitting a new set of needles to be fed from the needle-hopper to the straightening devices and the set already straightened delivered to the needle-receiving pan.

Figure 14:
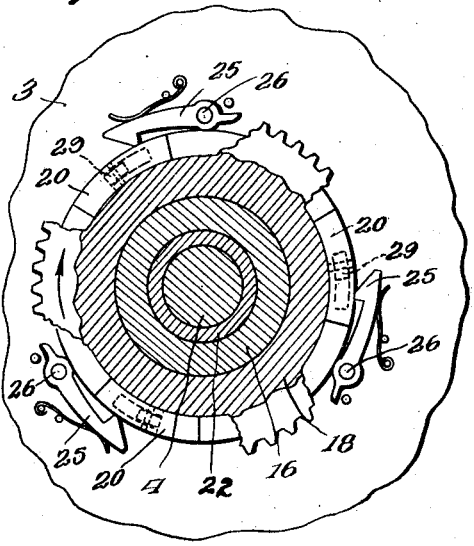
Fig. 14 is a similar view, showing the pawls disengaged while the dial is locked from rotary movement, while the needles are being straightened.
Figure 17:
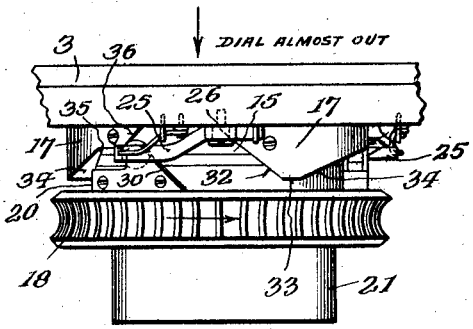
Fig. 17 is a similar view, showing the needle dial as it is nearing its outermost position.
Figure 16:
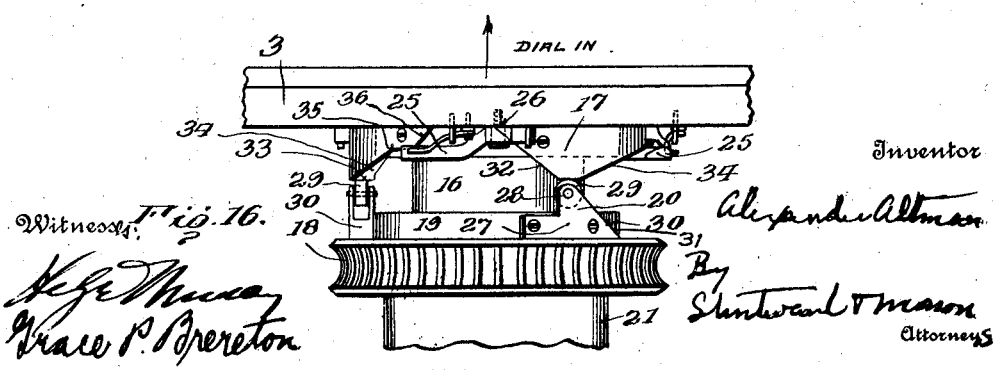
Fig. 16 is a plan view similar to Fig. 15, showing the needle-supporting dial moved all the way in, in the direction of the arrow.

As soon as the new set of needles has been fed to the dial, the latter is locked against rotary movement and the reversing gear 18 is operated by a clutch mechanism to be presently described, and the gear 18 moves in the opposite direction, as indicated by the arrows in Figs. 14, 15 and 17. The movement of the gear 18 in this direction, carries with it the roller mechanisms 20, which, as shown in Figs. 15, 16 and 17, first ride on the flat face of the dial as shown in Fig. 15, then suddenly strike the steep cam courses 32 for forcing the dial inwardly until the momentary dwell courses 33 are reached (see Fig. 16), after which the rollers ride along the cam courses 34 while the dial 3 moves outwardly during the straightening of the needles. The rollers then continue to ride along the cam courses 35 and 36, lifting the pawls 25 against the tension of their springs as the sloping surfaces 30 of the roller mechanism strike the tapering nose of each pawl, see Figs. 14 and 17. As the roller mechanism passes beneath the pawls, the latter drop behind the straight edge portions 31, and are located for the succeeding intermittent rotary movement to be given the dial.

*Mechanism for operating the reversing gear.*

Referring to Figs. 2, 8, 9, 10 and 11: The mechanism for controlling the reversing of the gear 18, and thereby the rotary intermittent movement of the dial 3, includes among other things a worm gear 37, keyed to a shaft 38 supported in bearings 39 bolted to the bed of the machine, the said worm being designed to mesh with the reversing gear 18, as clearly shown in Figs. 8 and 9; and oppositely arranged clutches 40 and 41 designed to be alternately engaged by the movable clutch member 42, thereby imparting successive opposite motion to the shaft to which is keyed the worm 38.

The clutch 40 is operated through the pulley 43 secured thereto, and is driven by a belt 44 which transmits motion from a main driving shaft (375) to be hereinafter described, and the clutch 41 is operated through the pulley 45 secured thereto and driven by the belt 46 which is crossed as shown in Fig. 2 and transmits opposite motion from said main shaft to the shaft 38, as will be readily understood.

The movable clutch member 42 is located intermediate the clutches 40 and 41, and is arranged to alternately engage the said clutches for driving the shaft 38 and worm gear 37 in successive opposite directions. The means for moving the intermediate clutch member 42 comprises a clutch lever 47 pivoted on the stud 49, extending from the standard 50 bolted to the bed of the machine.

The clutch lever, as shown in Fig. 11, comprises an upper forked end 51, which is connected to the movable clutch member 42, and a lower bifurcated end 52 designed to straddle a connecting web 53 of another lever 54, now to be described. The lever 54 is pivotally mounted upon the stud 49, which latter passes through the slot 55 formed in the upper end of the said lever 54. The offset portion 56 of the lever 54 which is attached thereto by the web 53, is provided at its upper end with a V-shaped portion 57 adapted to coöperate with a similarly inverted V-shaped portion 58 on the standard 50. The relatively V-shaped portions 57 and 58 slide upon each other in a manner to be presently described for alternately reciprocating the movable clutch member 42. A spring 59 is connected to the stud 49 and the lever 54 for keeping the relatively V-shaped portions 57 and 58 in engagement. To the lower end of the lever 54 and more specifically to the offset portion 56, is connected a link 60, the opposite end of the said link being connected to a reversing lever 61 pivoted at 62 to a standard 63 bolted to the bed of the machine. The upper end 64 of the reversing lever 61 is located in the path of the reversing devices 65 and 66 which are carried by the hub of the reversing gear 18 and alternately strike the said upper end 64 of the lever, thence through the interconnected mechanisms just described operating to engage either of the two clutches 40 or 41. The lower end of the lever 61 is provided with a mechanism adapted to coöperate with the locking means for holding the dial, and will be presently described in connection with the reference made to that mechanism.

The reversing devices 65 and 66 are relatively spaced and secured to the hub section 21 of the reversing gear 18, by the screws 67. The screws pass through slots 68 formed in the devices 65 and 66, which permits of adjustment, for relatively spacing the reversing devices in timing the reversing of the gear 18 for actuating the dial-rotating mechanism hereinbefore described.

The operation of the mechanism for controlling the reversing of the gear 18 is as follows:

Referring to Fig. 8 of the drawings, the reversing lever 61 is set for actuation by the reversing device 66, the gear 18 moving in the direction of the arrow indicated in said Fig. 8. When in this position the connecting link 60 between the reversing lever 61 and the lever 54 has rocked the clutch lever 47, and the clutch 41 is engaged by the intermediate clutch member 42 giving the direction of rotation to the gear 18, as shown by the arrow in said Fig. 8. The position of the relatively arranged V-shaped portions 57 and 58 is shown in dotted lines in Fig. 8, the spring 59 serving to keep them engaged. As the reversing device 66 strikes the upper end 64 of the reversing lever 61, the said lever is rocked on its pivot 62 to the position shown in Fig. 9. While the lever 61 is being rocked, the link 60 connected to the offset portion 56 of the lever 54 moves the said lever on its pivot stud 49, thereby causing the V-shaped portion 57 to gradually move downwardly on the V-shaped portion 58 against the tension of the spring 59, the web 53 which is straddled by the bifurcated end 52 of the clutch lever 47 serving to move the said lever 47 and disengage the clutch 41.

When the uppermost point of the V-shaped portion 57 reaches the lowermost portion 58, the clutch 41 has become disengaged, and as the movement of the lever 54 continues for a short distance, the points of the coöperating V-shaped portions clear each other and the spring 59 pulls the lever 54 upwardly, the V-shaped portion 58 riding on the inverted V-shaped portion 57, and, operating through the clutch lever 47, engages the movable clutch member 42 with the clutch 40, as shown in Fig. 9. When in this position the shaft 38 carrying the worm 37 rotates in an opposite direction, and the reversing gear 18 revolves in the direction of the arrow shown in Fig. 9 until the reversing device 65 strikes the upper end 64 of the lever 61, and the foregoing reversing operation is repeated.

The reversing of the direction of rotation of the gear 18 causes the hereinbefore described intermittent rotation of the needle-supporting dial, as well as the reciprocating movement thereof, as heretofore explained, through the coöperation of the cams 17 and roller mechanism 20.

*Needle dial locking mechanism.*

Referring to Figs. 4, 8, 9, 12 and 24 to 28, inclusive: The means for locking the needle-supporting dial against rotation while the said dial is being reciprocated, during a portion of which time the needles are straightened, comprises a locking lever 70 pivoted at 71 between depending ears 72 provided on the under side of the bed of the machine; a controlling pawl 73 and tripping lever 74, and lock-withdrawing or releasing mechanisms 75, coöperatively associated with the reversing lever 61, as hereinbefore referred to.

The locking lever 70 is provided with an engaging nose 76 designed to successively drop into recesses 77 provided in the dial 3, as it is intermittently rotated. Sloping faces 78 are arranged on one side of the recesses for facilitating the ready and sure engagement of the nose of the locking lever when it is released, for holding the dial in locked position while it is being reciprocated.

The locking lever swings upon its pivot 71 in a slotted casting 79, and is provided with a spring 80 for normally forcing the nose 76 of the lever into one of the recesses 77 formed in the dial. To an upper lug 81 of the locking lever is pivoted the controlling pawl 73, one arm 82 of which is designed to operate in conjunction with a recess 83 formed in a slide 84, and the other arm 85 of which is designed to be engaged successively by one of three pins 86 carried by the dial.

The tripping lever 74 is pivoted at 87 to the controlling pawl 73 and is provided with an upper arm 88 and a lower arm 89 provided with an engaging nose 90 designed to rest at certain times in a recess 91 formed in the edge of the lug 81, as will be presently described. A spring 92 is connected to the arm 88 of the tripping lever 74, and the lug 81, and serves to seat the nose 90 of the tripping lever into the recess 91 or against a stop pin 93 protruding from the arm 82 of the controlling pawl.

As has been hereinbefore stated, the locking lever is designed to hold the dial 3 against rotary movement while the said dial is reciprocated and the needles straightened. During the intermittent rotary movement of the dial however, the locking lever must be withdrawn, and the operation of the engaging and withdrawing of the said locking lever will now be described.

Referring more especially to Figs. 24 to 28 inclusive, the several positions of the locking lever 70, controlling pawl 73 and tripping lever 74 are illustrated. In the position shown in Fig. 25, the locking lever is ready to be released, one of the pins 86 being shown just ready to engage the arm 85 of the controlling pawl and lift the other arm 82 out of the recess 83 to permit the locking lever to be forced against the dial by the spring 80. In this position the nose 90 of the tripping lever 74 is out of the recess 91. The dial in its rotary movement brings the pin 86 under the arm 85 and releases the locking lever, so that it is forced against the face of the dial by the action of the spring 80 gradually finding its way down the sloping side 78 into the recess 77. This position is shown in Fig. 26 of the drawings, with the dial in its outermost reciprocatory position, ready to move inwardly. As the controlling pawl 73 is lifted by the pin 86, the tripping lever is also lifted and the nose 90 on the arm 89 drops into the recess 91, thereby keeping the arm 82 of the controlling pawl elevated and away from the recess 83 in the slide 84 from which it has just been lifted.

As the dial moves inwardly, as indicated by the arrows in Figs. 26 and 27, the locking lever 70 swings on its pivot 71 remaining in engagement with the dial, and as the dial approaches its innermost position, the outer end of the arm 88 of the tripping lever bears against the face of the dial slightly lifting the tripping lever until its nose 90 is clear of the recess 91, thereby permitting the arm 82 of the controlling pawl to drop into a path for engagement with the recess 83 in the slide 84, as the dial moves outwardly to the position shown in Fig. 28. The purpose of this is to allow the pawl arm 82 to seat within the recess 83 of the slide 84, so that the withdrawing mechanism 75 for pulling the locking lever 70 out of the recess 77 in the dial can readily coöperate with the said slide 84 and unlock the dial for rotary movement.

Referring to Fig. 12, the withdrawing mechanisms 75 is carried by the reversing lever 61 and comprises a relatively fixed lever 95 pivoted at 96 to the said lever. The lower edge of the lever 95 is provided with a beveled surface 97 designed to coöperate with a similar mating surface 98 formed on the inner side of a lug 99 provided on the slide 84. The slide 84 has a reduced end 100 which extends through an arcuate opening 101 formed in the reversing lever 61. The lever 95 is adjustably secured to the reversing lever 61, by means of the screw and slot connection 102, as shown in Fig. 12. In operation it will be seen that as the reversing lever is actuated by one or the other of the reversing devices 65 or 66, the relatively fixed lever 95 will be moved with the lever 61, and as the beveled face 97 wipes against the beveled face 98 formed on the lug 99 of the slide 84, the latter will be drawn outwardly in the direction of the arrows shown in Figs. 12 and 28.

The operation of this withdrawing mechanism 75 is relatively adjusted and timed with the reversing gear 18 and its associated parts, for permitting the rotation of the dial as will be understood.

*Needle-straightening devices.*

Referring to Figs. 3, 4, 7 and 29 and 30, the needle-straightening devices are supported upon the upper arcuate edge of the standard 6, and are designed to operate when the dial 3 is in locked position and is reciprocated outwardly. They comprise among other things, a plurality of hammers 105, mounted upon arms 106 extending from pivoted hammer levers 107; a series of blow levers 108 pivoted at 109 to the standard 6 adapted to coöperate with the aforesaid hammer levers 107; a blow wheel 110 mounted upon one end of the shaft 4, and means including a plurality of interconnected levers and tripping latches, for controlling the operation of the blow wheel and in turn the operation of the hammers 105.

The hammers 105 are provided with striking edges 111 fastened to the body portion of each hammer, and are relatively located to the sensitive finger of the crook-detecting mechanism and block members upon which the needles are straightened, both of which mechanisms will be presently described.

Inasmuch as the ten straightening devices or hammers shown are similar in construction and operate simultaneously, a description of but one will be given. Referring more particularly to Figs. 29, 30 and 31, each straightening hammer 105 is adjustably secured upon the arm 106 by the screw 112.

The arm 106 is relatively movable to the hammer lever 107 and when adjusted elevates or lowers the hammer 105 away from or toward the needle. This adjustment is fixed with relation to the hammer lever 107, and is made possible by the construction shown, in which an oppositely flanged pivot stud 113 is interposed between the hammer arm 106 and lever 107. Adjusting screws 114 are located upon either side of the pivot stud 113, and when manipulated serve to rock the arm 106 for adjusting the hammer 105, after which they are clamped down and the arm 106 is relatively fixed with relation to the hammer lever 107.

Each hammer lever 107 is pivoted at 115 to a bifurcated slide 116 adjustably movable in the base or supporting member 117 secured to the reduced portion 118 of the standard 6. The slide 116 is provided at its forward end with angularly disposed slots 119, arranged in the opposite side walls of the slide and designed to coöperate with an oppositely inclined or angular slot 120, formed in the center wall 121 of the base or supporting member 117. Working in these coöperating slots 119 and 120 is a pin 123 secured to the upper forked end of an adjusting rod 124 (see Fig. 5). The ten rods 124, corresponding in number to the straightening devices, have their lower ends 125 offset as at 126 and disposed within an eccentrically and spirally designed groove 127 formed in the wall of an adjusting disk 128. The adjusting disk 128 is screw-threaded upon the bushing member 129, and is held in adjusted position by the locking nut 130, also screw-threaded upon the bushing as shown in Fig. 4.

By this construction it will be seen that when the locking nut 130 is loosened, the adjusting disk 128 can be turned by a spanner wrench or the like, thereby causing the groove 127 therein to shift the relative positions of the rods 124 in either an upward or downward direction simultaneously, and consequently affects the slide 116 through the pin 123 and slot connections 119 and 120 for locating the hammers. It will be seen that as the slide 116 is moved, the pivotal point 115 of the hammer lever 107 will be changed and this together with the curved surface 147 of the nose 145 of the hammer lever, which is constantly in contact with a cooperating surface 146, provided on the blow lever 108, relatively lifts or lowers the hammers. The rods 124 are moved simultaneously and all of the hammers are given the same relative location desired, after which the locking nut 130 is screwed against the face of the adjusting disk 128 and the hammers are ready for operation.

A further adjustment is afforded the straightening hammers, said adjustment being more especially designed to increase or decrease the strength of the blow of the hammers.

Referring to Figs. 3 and 4, this adjusting means is supported upon threaded rods 131 secured to the standard 6 and projecting outwardly thereof, as shown in Fig. 4. Cooperating with the threaded ends 132 of the said rods are internally threaded sleeves 133 movable thereupon. The threaded sleeves 133 are carried by a yoke or supporting bar 134 through which the reduced ends or shafts 135 of the said sleeves pass. On the ends of the shafts 135 are keyed worm gears 136, which together with the flanges 137 on the sleeves cause the yoke or supporting bar 134 to move with the sleeves 133.

Meshing with the worm gears 136 are worms 138, keyed to a shaft 139 journaled in bearings 140 bolted to the yoke or bar 134. These worms are relatively pitched so that as the shaft 139 is turned by the handle 141, the sleeves 133 (of which there are three), move simultaneously upon the threaded ends 132 of the rods 131 in the same direction. Provided on the upper edge of the yoke or bar 134 is a plurality of pins 142 to each of which is connected one end of a spring 143. The opposite end of each spring 143 is connected to a depending pin 144 provided on each of the hammer levers 107. By this construction it will be seen that the nose 145 of each of the hammer levers 107 is kept in contact with a cooperating surface 146 formed on the blow levers 108 as shown in Figs. 4 and 29, and the adjustment of the slide 116 hereinbefore referred to will permit the curved under surface 147 on the nose 146 to shift the position of the hammer lever and elevate or lower the hammers.

When it is desired to increase the strength of the blow of the hammers, the handle 141 is operated and the shaft 139 turned to move the threaded sleeves 133 outwardly in the direction of the arrow indicated on Fig. 4. The tension upon the springs 143 being increased the stronger and quicker will be the blow imparted to the hammer levers 107 through the blow lever 108 by the blow wheel 110.

Referring now to Figs. 3 and 4. The blow wheel 110 consists of a flanged section 150 having secured thereto a plurality of striking members 151. These striking members are preferably partially countersunk into the surface of the flange section at its outer edge and are held in place by screws 152. They are beveled off as at 153 for cooperation with the arms 154 of the blow levers 108. The striking members 151 are equally spaced upon the blow wheel and are designed to move beneath the arms 154 of the blow levers 108, hereinbefore referred to, for lifting the said levers and transmitting the movement to the hammer levers 107 which in turn are connected to the hammers 105.

Springs 155 are connected to the blow levers 108 and to pins secured to the standard 6 thereby insuring the return of the blow levers when lifted by the striking members 151 on the blow wheel.

The blow wheel is keyed to the shaft 4 as shown at 156 and further held in position thereon by the cap 157 which may be screwed or otherwise fastened to said shaft. It will be readily understood that various size blow wheels can be substituted for heavier or lighter work, and in the event that a different size blow wheel should be employed, the cap 157 is removed and the substituted blow wheel keyed and fastened to the shaft as shown.

*Mechanism for controlling operation of blow wheel.*

Referring to Figs. 4, 7, 10 and 18 to 23 inclusive, the controlling means for operating the blow wheel during the hammering operation and straightening of the needles, comprises a worm gear 160, keyed to the shaft 4; driving mechanism including a worm 161 in mesh with the gear 160, keyed to the shaft 162. This shaft 162 is journaled in bearings 163 provided in the standard 164 bolted to the bed of the machine; a series of inter-connected levers for operating the clutch 165; and means including tripping latches for setting and operating the aforesaid levers.

The worm gear 160 is provided with a plurality of projecting pins 166 designed to operate upon the nose 167 of a master clutch controlling lever 168 for disengaging the clutch 165. The master clutch lever 168 is pivoted at 169 between upwardly extending ears formed on a pivot block 170 bolted to the bed of the machine. Pivotally mounted upon the said lever 168 near its upper end is a plurality of inter-connected levers, designed to cooperate with tripping latches and oppositely arranged notches formed in the sliding link connection 171 one end of which latter is loosely secured to the lever 168 by the pin and slot connection 172, and the other end of which is fastened to the clutch lever 173.

The clutch lever 173 is pivoted at 174 in a block 175 bolted to the bed of the machine, and is provided at its upper end with a movable clutch member 176 slidably mounted upon the shaft 162 and designed to engage a mating member to form the clutch 165. The pulley 177 is secured to one clutch member of the clutch 165 and when the clutch is engaged transmits motion from the main driving shaft 375, to be hereinafter referred to, through the belt 178.

The plurality of interconnected and associated levers pivotally mounted upon the master clutch lever 168 will now be described. Referring more particularly to Figs. 7, 10, and 18 to 23 inclusive, the two pivot studs upon which the levers are mounted are indicated at 180 and 181. The lever 182 is pivoted on the stud indicated at 181, and is of the bell crank type having a lower end which forms the pawl 183 and an upper end formed with an engaging nose 184. The pawl 183 is coöperatively associated with the notch 185 provided in the sliding link connection 171 as will be presently described.

A spring 186 secured to the master lever 168 bears upon the upper surface of the pawl 183 for seating the said pawl in the notch 185 and throwing the upper engaging nose 184 in the path of travel of one of the tripping latches to be later described.

The lever 187 is pivoted on the stud indicated at 181 also, and is of the bell crank type having a lower end which forms the pawl 188 and an upper end formed with a nose 189 designed to coöperate with the lower arm 190 of another lever 191 pivoted on the stud shown at 180, and to be presently described. The pawl 188 on the lever 187 is coöperatively associated with the notch 192 provided in the sliding link connection 171. A spring 193 secured to the master clutch lever 168 bears upon the upper surface of the pawl 188 for seating the said pawl in the notch 192 and permitting the coöperation of the nose 189 and the lower arm 190 of the lever 191.

The lever 191 is pivotally mounted upon the stud indicated at 180 and in addition to its lower arm 190, is formed with an upper arm having an engaging nose 194 designed to be relatively positioned in the path of the other tripping latch. A spring 195 is secured to the master clutch lever 168 and serves to keep the lever 191 with its nose 194 directed toward the tripping latch, and its lower arm 190 against the stop 196 formed on the lever 168.

The tripping latches which coöperate with the levers just described actuate the pawls 183 and 188 and are adjustably secured to the hub section 21 of the reversing gear 18 hereinbefore described, oscillating therewith, and tripping the levers 182 and 191 in a manner now to be described. The tripping latch 200 shown in detail in Fig. 22 of the drawings, coöperates with the engaging nose 184 of the lever 182, upon the lower end of which is formed the pawl 183. The latch 200 comprises a base plate 201 curved to fit the hub section 21 of the gear 18 and secured thereto by the screws 202 which pass through the slot 203 designed to facilitate adjustment; and a tripping lever 204 pivoted at 205. The lever 204 consists of laterally extending arms 206 and 207 the former of which is connected to a spring 208 fastened to the base plate 201, and the latter of which is relatively located for contacting with the nose 184 of the lever 182 as shown in Fig. 22.

The tripping latch 210 is of the same general construction comprising a slotted base plate 211 secured to the hub section 21 of the reversing gear 18 in spaced relation to the tripping latch 200 for their coöperative action.

The latch 210 is illustrated in Fig. 23 and includes a pivoted lever 212 having arms 213 and 214 respectively, the former being normally held against the shoulder 215 by the spring 216 and the latter extending laterally for engagement with the nose 194 of the lever 191.

The operation of the foregoing mechanism for controlling the operation of the blow wheel, and thereby operating the hammers follows.

Referring particularly to Figs. 7, and 18 and 23 inclusive, several positions of the controlling mechanism are shown; in the position shown in Fig. 7, the needle supporting dial 3 has been moved very close to its outermost reciprocating position, approximately indicated in plan view by Fig. 17, the needles being now straightened close to the shank. The blow wheel 110 keyed to the shaft 4 is still operating because of the engagement of the clutch 165. Motion is being transmitted from the driving belt 178 to the worm gear 160 in the direction of the arrow shown in full lines in Fig. 7. As the reversing latch 66 indicated in dotted lines in Fig. 7 and shown in full lines in Fig. 8, strikes the upper end 64 of the lever 61, the direction of rotation of the reversing gear 18 is reversed to that shown by the arrow in dotted lines in Fig. 7, and is indicated by the direction of the arrow shown in Fig. 18. At substantially the time of this reversing of the gear 18 the lever 207 of the tripping latch 200 contacts with the nose of the lever 182 rocking the said lever on its pivot 181 and lifting the pawl 183 out of the notch 185 at which time the spring 220 connected to the master clutch lever 168 and the standard 5, pulls the said master clutch lever in the direction of the arrow indicated in Fig. 18, permitting the engaging nose 167 thereof to rest against and within the path of travel of the pins 166 and at the same time allows the pawl 188 to drop into engagement with the notch 192 in the sliding link connection 171. The operation of the tripping latch lever 207 may occur slightly in advance of the reversal or at or about the same time.

The clutch 165 being still engaged, the continued movement of the worm gear 160 causes the pins 166 to bear against the beveled nose 167 of the master clutch lever and rocks it on its pivot which action together with the pawl 188 having dropped into the notch 192, withdraws the clutch member 176 of the clutch 165 in the direction of the arrow, to the position shown in Fig. 19. As soon as the clutch 165 becomes disengaged the worm gear 160 stops rotating and in turn the shaft 4 and blow wheel 110 also stop, thereby terminating the hammer operations upon the needles. When the straightening or hammering operation ceases the dial 3 is in its outermost position.

It being understood that the reversing or oscillation of the gear 18 is a continuous operation, the position indicated in Fig. 19 shows the reversing device 65 having just struck the upper end of the lever 61 and caused the gear 18 and the tripping latch 200 and 210 to move in the direction of the arrow shown in dotted lines.

At the time of the dropping of the pawl 188 into the notch 192, the lever 187 is rocked on the pivot 181 and the nose 189 of said lever forces the arm 190 of the lever 191 against the stop 196, with the upper arm 194 of said lever projecting into the path of travel of the tripping latch 210. As the tripping latch 210 continues to move in the direction of the arrow shown in dotted lines in Figs. 19 and 20, the said latch strikes the nose 194 of the lever 191 as shown in Fig. 20, thereby rocking the said lever 191 on its pivot 180 so that its lower arm 190 moves the nose 189 of the lever 187 causes the pawl 188 to be lifted out of the notch 192 in the sliding link connection 171 and permits the clutch member 176 to become engaged with the clutch lever 173 and the standard 164.

It will be seen that the construction of the tripping latches 200 and 210 will permit the respective spring tensioned levers 207 and 214 to swing by the respective noses 184 and 194 of the levers 182 and 191.

As soon as the clutch 165 becomes engaged the worm gear 160 is again driven in the same direction, namely that of the arrow shown in full lines in Figs. 7, 18 and 21, and the hammers are operated for straightening the needles. The relative intermittent rotary movement of the dial occurs while the worm gear 160 is stationary, and the reversing gear 18 is moving in the direction of the arrow in dotted lines in Fig. 18.

When the pawl 188 is lifted from the notch 192 and the clutch 165 becomes engaged, the sliding of the link connection 171 in the direction of the arrow shown thereon in Fig. 21, with the clutch lever 173 causes the pawl 183 to drop into the notch 185 so as to set the levers 182 and more especially the arm with the nose 184 for tripping, by the latch 200 in a subsequent operation.

*Needle crook detecting devices.*

Referring to Figs. 4, 29, 30 and 31 to 35 inclusive, the needle crook detecting mechanism comprises a plurality of sensitive fingers designed to contact with the blade of each needle upon its side oposite to the hammer and in close proximity thereto; a selective blow member inter-connected with each sensitive finger adapted to receive the blow from the hammer lever 107; and a positioning counterweight associated with each selective blow member for normally locating it with respect to the hammer levers.

The sensitive finger 225 comprises a forwardly extending arm 226 to which is secured in any desirable manner the needle contacting finger 227. The arm 226 is adjustably fastened by the screw 228 to a shaft 229 mounted in bushinged bearings 230 formed on the end of a supporting plate 231 which is secured to the upper wall 232 of the supporting member 117 by the screw 233. The hub section of the arm 226 has fastened to it an angular plate 234, through the outstanding arm 235 of which, passes the adjusting screw 236. By adjusting this screw 236 which bears against the plate 231, the relative position of the contacting finger 227 can be obtained for permitting the position of the needle which is brought inwardly by the dial from striking the said contacting finger.

Secured by a pin 237 or in any other desired manner, to the shaft 229 is the opposite, or outwardly extending arm 238 of the sensitive finger. The end of the arm 238 is connected to a link 239 which in turn is connected to an overhanging arm 240 adjustably clamped upon a shaft 241. The shaft 241 is journaled in bearings 242 extending upwardly from a plate 243 fastened by screws to the upper side of a projecting wall 244 formed integral with the supporting member 117.

Adjustably secured to the shaft 241 by the clamp 245 is the positive selective blow member 246. This selective blow member 246 is formed with a fin section 247 upon the lower portion of which is provided a series of stepped projections 248 radially divided on lines extending from the center of the shaft 241, (see Figs. 32 and 33).

These stepped projections, illustrated in Figs. 34 and 35 are designed to coöperate with a striking member 249 secured to each hammer lever 107 (see Fig. 29).

The striking blocks or members 249 can be readily removed as they wear, and new ones inserted.

The striking block is cut away as at 251 to permit its outer edge 252 to positively engage any one of the stepped projections which may be selected. A highly sensitive spring 253 is secured to the plate 231, and the outer end thereof bears downwardly upon the upper side of the arm 238 of the sensitive finger for constantly keeping the finger 227 on the arm 226 in contact with the blade of the needle for detecting the irregularities and crooks therein.

In order to normally and uniformly locate the positive selective blow members 246 with relation to the arcuately disposed straightening devices, an adjustable counterweight 254 is secured to each shaft 241. This adjustment is required because of the gravitating tendency of the selective blow members 246 to swing out of their relative locations to the hammer levers 107 and striking members 249. Each counterweight 254 is adjusted upon each shaft 241 so that the normal position of the selective blow members 246 will be as shown in Fig. 32, that is to say, with its edge upon which is formed the highest projection 248 substantially in alinement with an axis drawn through the center of the said shaft 241 in radial alinement with the center of the shaft 4 of the machine. As shown in Fig. 3, the relative positions of the selective blow members 246 when normally located, are in accordance with the radial alinement just described. This radial alinement is made possible by the adjustment of the counterweight 234 for counterbalancing the normal tendency of the selective blow member 246 to hang with its heaviest point downward.

The operation of the needle crook detecting mechanism follows:—

When the needles to be straightened are brought inwardly by the dial 3 between the hammers 105 which stop in elevated positions after prior operations, and the sensitive finger 225; the finger 227 is brought into contact with the blade of the needle beginning at a point near its shank as diagrammatically shown in Fig. 36. The spring 253 serves to keep the contact finger 227 sensitively against the needle blade. When the needles are being straightened they are revolved by a mechanism hereinafter described. As the contact finger 227 is vibrated by the irregularities and crooks in the blade of the needle as the said needle is drawn outwardly in the direction of the arrow shown in Figs. 36, 37 and 38, the movements of this vibration are transmitted to the selective blow member 246 by the rocking of the sensitive finger and its manipulation of the link connection 239 inter-connected with the overhanging arm 240 secured to the shaft 241 to which the selective blow member 246 is also fastened.

The position of the selective blow members 246 and the stepped projections 248 are located for relatively light or heavy blows as may be determined by the sensitive finger 227, and in Figs. 33 and 35 a selected position is shown. It will be understood that, the greater the crook in the needle the heavier must be the blow, consequently the hammer levers 107 will operate to impart heavier blows when the lowest stepped projections 248 are selected by the sensitive finger, and reversely when the crooks are slight, the blows delivered will be light because of the selection of the higher stepped projections on the selective blow member.

*The block members upon which the needles are straightened.*

Coöperating with the straightening hammers and the crook detecting mechanism are relatively adjustable block members against which the needle is driven by the blow of the hammer and upon which it is straightened.

Referring to Figs. 4, 6, and 31, the block members upon which the needles are straightened comprise a series of bars 260 adjustably mounted upon the standard 7. The bars 260 are retained upon the standard by a plate 261 fastened by screws which pass through spaced lugs between which the bars are movable.

The upper end of each bar 260 has secured thereto a block member 262 upon the upper edge of which the needle rests when being straightened. The block member 262 may be suitably guided by the upper portion of the standard 7 and the plate 263. The lower ends of the bars 260 are offset as at 264 into the eccentrically and spirally arranged groove 265 of an adjusting disk 266 screw threaded upon the threaded bushing 129. A locking nut 267 bears against the face of the adjusting disk 266 and serves to hold it in adjusted position. In operation the locking nut 267 is loosened and the disk 266 turned by a spanner wrench or other device, thereby causing the bars 264 to be moved simultaneously by the action of the spirally arranged groove 265, and the block members 262 upon which the needles are straightened are relatively elevated or lowered as the case may be. It is desirable to adjust these blocks 262 with relation to the straightening hammers, the crook detecting mechanism and the needle supporting dial which presents the needle, so that the blade of the needle will be straightened in alinement with the shank of the needle.

Mechanism for revolving needles being straightened.

Referring to Figs. 1, 6, 48 and 49:—

The mechanism for revolving the needles while they are being straightened comprises an endless band or belt 270 preferably of rubber or other similarly acting material which passes over a pulley 271 secured to a shaft 272 slidably supported in the bearing sleeve 273 which is mounted between two standards 274 and 275 secured to the supporting standards 6 and 7 respectively, and over a pulley 276 similarly fastened to a shaft 277 and slidably secured to and within a sleeve 278 mounted in standards 279 and 280, secured to the standards 6 and 7 respectively.

The belt 270 is of square or rectangular cross section and rests upon the outer periphery of the needle dial 3 as it intermittently rotates. When the needles are seated in the V grooves in the periphery of the dial the belt 270 is designed to contact with the shank of the needle which extends a short distance out of the groove, and when the belt is moved the needles are revolved. A needle guard 281 is supported between the pulleys 271 and 276 and may be provided with a flange 282 designed to rest between the central portions of the belt or band and separate them as shown in Fig. 4.

The means for driving the band or belt 270 comprises a worm gear 283 formed on the sleeve 278 which is designed to mesh with a worm 284 keyed to the upper end of a shaft 285 journaled in bearings 286 one of which is secured to the standard 7 and the other of which is secured to the standard 280. (See Figs. 6 and 49.) The shaft 285 is partially positioned in the groove 287 formed in the standard 7, and has keyed to its lower end a beveled pinion 288 adapted to mesh with a beveled gear 289 keyed to the shaft 4.

It will be obvious that when the shaft 4 is rotated by the mechanism controlling the operation of the blow wheel hereinbefore described, motion will be transmitted through the beveled gear 289 to the beveled pinion 288 and the shaft 285 will be rotated thereby driving the worm 284 and the meshing worm gear 283 on the sleeve 278 keyed to the shaft 277 for imparting rotary movement to the pulley 276 over which the band 270 passes. The band continues to move over the shank of the needles for revolving them while being straightened and as long as the shaft 4 is rotated.

Inasmuch as the dial 3 is given a reciprocating movement while the needles are being straightened, it is necessary to move the band 270, and pulleys 271 and 276 therewith.

The means for accomplishing this includes two spaced arms 290 and 291 secured to the face of the needle dial, (see Fig. 1), which are designed to engage the flanges of pulleys 292 and 293, respectively. The arms 290 and 291 are provided with tapered edges 294 for insuring their engagement between the flange of the pulleys 292 and 293. There are three groups of the arms 290 and 291, each one being designed to successively engage the flanged pulleys 292 and 293 as the dial is rotated. Referring to Figs. 48 and 49, it will be seen that as the dial is moved inwardly the pulleys 292 and 293 which are keyed to the respective shafts 272 and 277 and between the flanges of which extend the arms 290 and 291, cause the said shafts 272 and 277 to be moved through the sleeves 273 and 278 respectively. The movement of the dial in an outward direction causes the revolving band to be carried with it in a similar manner. A collar 295 may be provided on either of the shafts 272 or 277 for limiting the outward movement of the band.

Needle feeding mechanism.

Referring to Figs. 1, 44, 44ª, and 45 to 47 inclusive:—

The needle feeding mechanism for delivering the unstraightened needles from the hopper to the peripheral V-shaped seats in the needle supporting dial comprises a needle spacing and delivering drum 300 rotatably mounted in the lower corner of a needle hopper 301; an ejecting spring finger 302 for pushing the spaced needle from the delivering drum into the V-shaped seats in the dial 3; and means for actuating the needle spacing and delivering drum including a notched wheel 303 with which coöperates a series of pins 14, (hereinbefore mentioned) carried near the peripheral edge of the dial.

The needle spacing and delivering drum 300 consists of a laterally grooved cylinder 305 having a circumferentially arranged groove 306 intersecting the lateral grooves 307. These latter are equally spaced upon the edge of the cylinder 305 as shown in Figs. 44ª and 46, and on the adjoining cylinder 308 pinned to the cylinder 305 as shown at 308ª. As shown in Fig. 46, the shank of the needle rests within the lateral groove 307 and the blade of the needle is designed to be supported upon the peripheral surface of the cylinder 308. These cylinders 305 and 308 are supported upon the shouldered bolt or rod 309, the head of which is countersunk in the notched wheel 303 and the screw threaded end of which is designed to receive a cone 310 and clamping screw 311 as shown in Fig. 46. When needles with larger or smaller shanks are used, the cylinders 305 and 308 can be readily removed and others with the proper length lateral grooves and supporting surfaces may be substituted.

The needle ejecting finger 302 is secured to the end wall of the needle hopper by screws 312 and is provided with a needle engaging point 313 which extends within the circumferential groove 306 formed in the grooved cylinder 305. It also has an integral finger 314 designed to bear upon the shank of the needle already seated in the V-shaped seat in the dial 3, as the latter is rotated in the direction of the arrow shown in Fig. 44ª.

It will be apparent that as the needle is seated beneath the integral finger 314 it will be slightly raised, thereby depressing the needle engaging point for ejecting the needle from the spacing and delivering drum into one of the V-shaped needle retaining seats provided in the dial. The integral finger 314 extends well up to the revolving band as shown in Fig. 44.

A needle retaining guard 315 is secured to the bottom wall of the hopper by screws 316 and serves to keep the needle within the lateral grooves 307 of the cylinder 305. (See Fig. 44ª). The rotary movement of the needle spacing and delivering drum 300 is preferably checked by a spring drag pawl 317 suitably tapered at each end for ready engagement and withdrawal with the beveled sides of the notches 318 provided in the wheel 303 and with which the pins 14 carried by the dial coöperate. There are as many pins 14 carried by the dial 3 as there are grouped needle retaining seats in the dial. This permits of the feeding of one needle to each V-shaped seat in each group for straightening all of the needles in one group simultaneously.

The needles are fed from the hopper to the supporting dial as the latter is given its rotary movement hereinbefore described. When ten needles have been delivered to one of the three groups or stations provided in the dial, the dial is locked against rotary movement and reciprocated during the straightening operation.

The form of needle hopper found to advantageously position the needles for delivering to the dial, is triangular in longitudinal contour and comprises side walls 320, an end wall 321 and an inclined bottom wall 322. The bottom wall 322 is provided with a slot 323 through which the follower 324 extends as the needles move downwardly in the hopper. The follower 324 is carried by a rod 325 from the upper end of which extends a cross arm 326 secured to a parallel rod 327. The rod 327 is vertically movable in a pivoted sleeve or support 328 journaled on a stud 329 between bearings 330 projecting from a plate 331 secured to the side wall of the hopper. A key 332 in the sleeve 328 serves to keep the follower in a predetermined vertical plane of movement. For insuring the downward movement of the follower upon the shank of the needles, a spring 333 is connected to the arm 326 and to a pin 334 extending from the wall of the hopper.

When filling the hopper, with needles to be straightened, the handle 335 extending upwardly from the rod 327 is lifted and swung outwardly into the position shown in Fig. 47. When in this position the bottom edge 336 of the rod 327 rests upon the shoulder 337 formed between the bearings 330 and holds the follower out of the hopper while it is being filled. A screw 338 in the bottom edge of the rod 327 prevents the said rod from being withdrawn too far.

A side gage 339 for the needles is also provided in the hopper. This can be adjusted by the manipulation of the collar and screw 340 which bears against the rod 341 to which the gage 339 is attached. For different lengths of needles the gage is moved so that the points of the needles will just touch and clear its side, thereby facilitating their uniformity of position in the hopper.

*Straightened needle discharging and receiving mechanism.*

Referring to Figs. 1, 2, and 39 to 43 inclusive, the mechanism for taking the straightened needles from the dial and delivering them to a needle receiving pan comprises, among other things, a yieldingly supported yoke 345 designed to straddle the dial and direct the needles into a chute 346, a reciprocating needle receiving pan 347 and means including a double threaded worm 348 for reciprocating the said needle receiving pan.

The yieldingly supported yoke 345 comprises two side walls 349, an offset slotted portion 350, and a U-shaped lower portion 351. A retaining band 352 is connected to the outer side wall of the offset portion at 353 and to the end 354 of the needle guard 281 at 355. This band 352 retains the straightened needles after leaving the straightening devices until they are ejected from the dial. A spring 356 is secured to the inner side wall of the offset portion 350 by the screw 357, and has an angularly extending end 358, against which the needles strike, as the dial rotates in the direction of the arrow shown in Fig. 40 the needles being thereby ejected from the V-shaped seats in the dial and directed into the chute 346.

To the lower U-shaped portion 351 of the yoke is secured one end of a spring 359, the other end thereof being attached to the bed of the machine at 360. By this construction it will be seen that the yoke and retaining band are yieldingly held against or in close proximity to the dial for facilitating the ready discharge of the needles during the rotation of the dial.

The chute 346 is supported upon the standard 361 secured to the bed of the machine, as shown in Fig. 39, and is provided with a flared upper end 362 (see Fig. 2) for directing the needle through the chute with its shank end pointing downwardly (see Fig. 39).

The needles are received into the needle box or pan 347 into which is placed the partitioned tray 363, for relatively spacing and assorting the needles in directed groups.

The needle receiving pan 347 is supported upon a reciprocating carrier 364 movable upon the guiding rods 365 positioned between suitable supports 366 extending from the bed of the machine. The reciprocating carrier 364 is provided on its under side with a lug 367 designed to alternately engage the double threads upon the carrier. The worm 348 is driven by a belt 368 which passes over the pulley 369, keyed to the end of the worm 348, and a pulley 370 keyed to the shaft 4. When the shaft 4 is rotated during the straightening operation as hereinbefore described, the worm is operated and the needle pan is moved so as to evenly distribute the discharged straightened needles when the dial is again rotated.

Main driving shaft.

Referring to Figs. 1 and 2, the main driving shaft 375 is supported in bearings 376 formed on depending hangers 377 bolted to the machine bed. Mounted upon the main shaft is a series of pulleys 378, 379 and 380 over which passes the belts 44, 46 and 178, respectively, hereinbefore described in connection with the dial reversing mechanism and the blow wheel operating means. A driving pulley 381 is also carried by the main shaft 375 and is associated with a clutch 382 controlled by the operating lever 383. A driving belt 384 passes over the pulley 381 and beneath two pulleys 385 arranged side by side at the rear of the machine as shown in Fig. 2. From beneath these pulleys 385 the driving belt is carried to a suitable source of power not shown. A crank handle 386 is provided on one end of the main driving shaft 375 and permits of the machine being turned over by hand when adjusting or timing the several mechanisms. While I have shown the form of driving mechanisms for the needle machine, it will be understood that various other arrangements may be employed.

Needle dial markings.

For readily observing the action of the straightening devices and the relative straightening of the needles, the three groups of ten needles each are indicated on the face of the dial by the letters A, B, and C.

Each needle retaining seat in the periphery of the dial in each group is numbered from 1 to 10 as shown. If for any reason one or more of the straightening devices and associated mechanisms should fail to properly operate upon the needle to straighten the same, this fact can be easily determined by examining the needle and tracing it back to the numbered needle retaining seat in the lettered group from which it was discharged, and the particular hammer and other devices which operated upon this needle can be properly adjusted.

The modification of the straightening device shown in Figs. 50 and 51 of the drawings is substantially of the same general type heretofore described with the exception that the block member upon which the needle is straightened is eliminated. Referring to Figs. 50 and 51 the straightening hammer 105, hammer lever 107, and the operating means therefor are all of the same construction and include the heretofore described adjustments.

The crook detecting mechanism shown and more particularly the selective blow member and its mounting are also similar. The forward end of the sensitive finger however 225 is of a different construction for coöperation with a relatively fixed stepped member now to be described.

Secured to the shaft 390 which corresponds to the shaft 229, is an arm 391 to the end of which is yieldingly pivoted a sensitive finger 392. The sensitive finger 392 is provided with a needle engaging plate 393 which contacts with the needle while it is being straightened.

The sensitive finger 392 is pivoted in the bifurcated end 394 of the arm 391 on the stud 395, and is formed with a lug portion 396 designed to abut against the shoulder 397 on the said arm 391. A spring 398 secured to the bifurcated end 394 and hooked beneath the finger 392 serves to keep the lug 396 against the shoulder 397.

Coöperating with the sensitive finger 392 is an impact member 498 which may be adjustably supported upon the standard 7 of the machine. The upper end of the member 498 is finely stepped as at 399 (see Fig. 50). The lower corner 400 of a block 401 is designed to coöperate with these stepped portions 399.

In operation, it will be seen that as the plate 393 of the sensitive finger picks up a crook in the needle it will be transmitted to the selective blow member for its relative setting to control the degree of the blow to be given by the hammer.

The yielding mounting of the sensitive finger does not affect the operation of the crook detecting mechanism. When, however, the selective blow member has been relatively located and the blow by the hammer is given the needle, the impact from this blow will relatively locate the yielding arm 392 and more particularly the corner 400 upon one of the stepped portions 399 according to the strength of the blow given and thereby permit the needle to be straightened.

*Operation of machine.*

The needles after being tempered in the usual manner are deposited in the needle hopper 301, as shown in Figs. 46 and 47 with the spring pressed keeper 324 resting upon the shank ends thereof. From the hopper, the needles are successively fed by the spacing and delivering drum 300 to the V-shaped slots 9 formed in the periphery of the needle dial support 3. The feeding of the needles from the hopper takes place when the dial 3 is moving in a counter-clockwise direction, as shown by the full line arrow in Fig. 7.

The needle dial 3 is moved in this direction by the action of the reversing gear 18 to the hub 19 of which is secured the roller sections 20, with which the pawls 25 carried by the dial engage. As shown in Figs. 13 and 15, the pawls 25 are in engagement for rotating the dial 3, while the needles are fed from the hopper. When the dial 3 is rotated, it will be seen that the pins 14, carried thereby, successively engage the notches in the wheel 303, thereby causing the drum 300 to revolve intermittently and deliver a needle beneath the end 313 of the finger 302, the latter forcing the needle into the V-shaped slot 9 (see Fig. 44ᵃ). There are ten pins 14 shown, corresponding in number to the number of needle retaining seats for delivering a needle to each seat. When the reversing gear 18 is rotating to revolve the needle dial, while the needles are being fed into the V-shaped seats, the clutch member 40 is in engagement with the movable clutch member 42, (see Fig. 9). The locking lever 70 is disengaged during the rotary movement of the dial, the beveled surface 97 upon the lever 95 secured to the lever 61 having forced the beveled surface 98 upon the lug 99 located on the slide 84, outwardly into the position shown in said Fig. 9.

When the last or tenth needle has been delivered to the V-shaped seat, the reversing mechanism for disengaging the clutch 40 and engaging the clutch 41 with the movable clutch member 42, operates by reason of the reversing latch 66 striking against the upper end 64 of the lever 61, moving the said lever on its pivot 62. The clutch lever 47 and its interconnected parts hereinafter referred to are thereby operated for engaging the said clutch 41. As the points of the mating surfaces 51 and 58 clear each other during this operation, it will be apparent that after the lower end of the lever 61 is moved, the lug 99 of the slide 84 becomes disengaged from the end of the lever 95 and can be further released for locking the dial. Referring now to Fig. 25; just before the dial 3 stops rotating, one of the pins 86 carried by the dial strikes the arm 85 of the pawl 73 and lifts the arm 82 thereof out of the notch 83 which is provided in the slide 84, thereby allowing the spring 80 to force the locking lever 70 and its nose 76 against the dial, and more especially the inclined surface 78, along which it rides until the notch 77 in the dial is reached. At this time the reversing mechanism operates, the clutch 40 becomes disengaged, and the clutch 41 becomes engaged (see Fig. 48). The dial is now locked against rotary movement and is ready to be reciprocated. As soon as the clutch 41 is engaged, the reversing gear 18 starts to move in an opposite direction (see arrow in Fig. 14).

Referring to the Figs. 10 and 14 to 18 inclusive, the roller sections 20 carried by the reversing gear 18 begin operating first for a short distance upon the face of the dial 3, and then successively upon the cam courses 32, 34, 35 and 36. As the roller 29 of each section 20 rides upon the relatively steep course 32 of each cam 17, the dial 3 is forced inwardly, thereby presenting the needles to be straightened beneath the hammers 105 and above the selective fingers 225 and the block members 262 (see Fig. 29). Subsequent to the slight dwell of the roller 29 upon the high points 33 of the cams, the said rollers ride upon the cam course 34 as the needle dial moves outwardly.

During the outward movement of the dial, the scraping devices including the hammers and needle crook detecting devices are operated. Referring now to Figs. 3, 4, 10 and 18 to 23 inclusive, the blow wheel 110 is now operated for striking the blow levers 108, which in turn strike against the hammer levers 107 for causing the hammers 105 to vibrate. The relative timing of the operation of the blow wheel is dependent upon the actuation of the inter-connected levers and tripping latches 200 and 210, as heretofore described. During the time that the hammers 105 are operating, the clutch 165 is in engagement with the movable clutch member 176, as shown in Figs. 17, 18 and 21. In the position shown in Fig. 21, the clutch 17 has just been let in by the striking of the tripping latch 210 against the nose 194 of the lever 191, and it is this operation which takes place at or about the time the rollers 29 reach the dwells 33 on the cams 17 prior to the movement of the dial outwardly. As the rollers 29 ride along the cam course 35, the needles are straightened by the action of the needle crook detecting mechanism, including the selective fingers which follow the curves and crooks in the blade of the needle, and the relative striking or vibrating of the hammers against the needles upon the middle of the block members 262.

The relative setting of the selective blow devices 246 and their striking members 249 carried by the hammer lever 107 depends upon the degree of the curve or crook discovered by the selective fingers and light or heavy blows are made possible according to the selection made by each blow device 249.

When the clutch 176 is drawn into engagement, it will be noted that the nose 184 of the lever 182 is set for engagement with the tripping latch 200 carried by the hub 21 of the reversing gear 18. As the rollers 29 continue to move along the cam courses 35 and 36, after which the dial is moved all the way out by the action of the spring 23, interposed between the dial 3 and the standard 7, the reversing action of the gear 18 again takes place, and at or just before the operation, it will be noted that the tripping latch 200 strikes the nose 184 of the lever 182 and lifts the pawl 183 out of the notch 185 in the bar 171 (see Fig. 18), thereby setting the upper inclined nose 167 of the master clutch lever 168 in the path of the pins 166 carried by the worm gear 160, which continues to revolve as long as the clutch members 176 and 165 are engaged. Referring to Fig. 19, it will be seen that the slightest movement of the worm gear 160 and any one of the pins 166 against the inclined surface 167 of the lever 168 will disengage the clutch member 176 from the member 165 and the worm gear 160 will be stopped. This worm gear being keyed to the shaft 4 causes the blow wheel 110 to cease revolving and in turn the hammers are stopped. During this operation, it will be noted that the nose 194 of the lever 191 is set for engagement by the tripping latch 210 upon the next operation. As heretofore described, the operation of the reversing lever 61 at this time causes the beveled surface 97 provided upon the lever 95 to ride against the beveled surface 98 upon the lug 99 formed on the slide 84, and in accordance with the description given of the locking mechanism, and referring to Figs. 24 to 28 inclusive the said slide 84, into the notch 83 of which the pawl 85 has dropped, will be withdrawn, thereby moving the nose 76 of the locking lever 70 out of the notch 77 in the dial, for another intermittent rotary movement, during which movement the straightened needles are delivered through the discharging means into the receiving needle pan, and a new set of needles to be straightened is fed from the dial to the V-shaped seats 9 on the periphery of the dial.

While the needles are being straightened, it will be noted that the band wheel 270 is moved over the shanks of the needle through the operation of the shaft 4 and the bevel gearing shown in Figs. 6 and 49. It will also be noted that the said band reciprocates inwardly and outwardly with the dial as hereinbefore described. As the dial rotates, the discharge of the straightened needles is effected by the action of the ejecting spring 358 against which the needle strikes (see Fig. 40). The needles are deflected through the chute 346 into the needle receiving pan 347, which is relatively intermittently movable at the time of the rotation of the shaft 4.

From the foregoing description, it will be obvious that an automatic machine has been produced, which is capable of successively grouping a plurality of needles, simultaneously straightening the said needles by mechanism including a positive blow selecting means, which determines the character of the blow to be given each needle, and designed to readily discharge the straightened needles during the delivery of another set of needles to be straightened.

Various changes in the invention may be resorted to without departing from the spirit thereof, and I do not limit myself to the exact details or relative proportions herein set forth.

What is claimed as new is:—

1. An organized machine for straightening needles including means for successively grouping a plurality of needles, mechanism for simultaneously straightening said needles including positive blow selecting means for determining the character of the blow to be given each needle.

2. An organized machine for straightening needles including means for successively grouping a plurality of needles, mechanism for simultaneously straightening said needles, including a blow wheel, a plurality of straightening hammers controlled by the blow wheel, and means for controlling the blow wheel.

3. An organized machine for straightening needles including means for successively grouping a plurality of needles, mechanism for simultaneously straightening said needles including positive blow selecting means for determining the character of the blow to be given each needle, and means for discharging the straightened needles during the delivery of another set of needles to be straightened.

4. An organized machine for straightening needles including means for successively grouping a plurality of needles, mechanism for simultaneously straightening said needles, including a blow wheel, a plurality of straightening hammers controlled by the blow wheel, means for controlling the blow wheel, and means including a series of blow selecting devices for determining the strength of the blows to be given by the hammers.

5. An organized machine for straightening needles including means for successively grouping a plurality of needles, mechanism for simultaneously straightening said needles, including a blow wheel, a plurality of straightening hammers controlled by the blow wheel, means for controlling the blow wheel, means for detecting crooks in needles, and means including a series of blow selecting devices interconnected with the crook detecting means for determining the strength of the blows to be given by the hammers.

6. An organized machine for straightening needles including a support for a plurality of needles with means for feeding a plurality of needles to said support, straightening devices for simultaneously operating upon such needles, needle crook detecting means simultaneously operating upon said needles, selective blow devices in operative connection with said needle crook detecting devices, and a blow wheel for operating the straightening devices.

7. An organized machine for straightening needles including a support for a plurality of needles with means for feeding a plurality of needles to said support, straightening devices for simultaneously operating upon such needles, needle crook detecting means simultaneously operating upon said needles, selective blow devices in operative connection with said needle crook detecting devices, a blow wheel for operating the straightening devices, and means for controlling the blow wheel during the straightening operation.

8. An organized needle straightening machine comprising straightening devices, a movable needle support for conveying the needles in groups to the straightening devices, means for intermittently moving the needle support, locking mechanism for holding the needle support while the needles are being straightened, and interconnected mechanism including clutches for operating the means which intermittently moves the needle support.

9. An organized needle straightening machine including in combination, a movable needle support for holding needles in predetermined groups, needle straightening devices including a plurality of hammers, means including interconnected levers for controlling the operation of the hammers, needle crook detecting mechanism associated with each hammer for determining the strength of the blow to be given the needle by the hammer, and means for adjusting the straightening devices and the needle crook detecting mechanism.

10. An organized needle straightening machine including in combination, a needle support to receive predetermined groups of needles, needle straightening devices including a plurality of hammers, and relatively positioned block members upon which the needles are straightened, needle crook detecting mechanism connected with each hammer, consisting of a positive selective blow device for determining the strength of the blow as compared with the crook in the needle, and means for continuously revolving the needles while being straightened.

11. In a machine of the character described, a needle supporting dial for receiving a plurality of needles, means for intermittently rotating said dial while the needles are being fed thereto, means for locking the dial against rotation and for reciprocating it longitudinally while the needles are being straightened, and ejecting mechanism which operates while the dial is being rotated and fed with a fresh supply of needles, to eject those needles already straightened.

12. In a machine of the character described, a needle supporting dial for receiving a plurality of needles, means for intermittently rotating said dial while the needles are being fed thereto, means for locking the dial against rotation and for reciprocating it longitudinally while the needles are being straightened, ejecting mechanism which operates while the dial is being rotated and fed with a fresh supply of needles, to eject those needles already straightened, an endless band driven over the shanks of the needles during the straightening operation, and means for reciprocating the endless band in unison with the reciprocation of the dial.

13. In an apparatus of the character described, needle straightening devices including independently operated hammers, an intermittently rotated blow wheel for operating the hammers, and interconnected levers and tripping latches for controlling the intermittent movement of the blow wheel.

14. In an apparatus of the character described, needle straightening devices including independently operated hammers, an intermittently rotated blow wheel for operating the hammers, interconnected levers and tripping latches for controlling the intermittent movement of the blow wheel, and a needle crook detecting device coöperatively associated with each hammer.

15. In an apparatus of the character described, needle straightening devices including independently operated hammers, an intermittently rotated blow wheel for operating the hammers, interconnected levers and tripping latches for controlling the intermittent movement of the blow wheel, a needle crook detecting device coöperatively associated with each hammer, each needle crook detecting device being provided with a sensitive finger contacting with the blade of the needle beneath and to one side the hammer, and a positive selective blow device movable with relation to the hammers, and connected with said finger.

16. A needle straightening machine including in combination a movable needle support, means for intermittently rotating said support, means for feeding a plurality of needles to the needle support when being rotated. means for reciprocating the needle support, and devices for straightening a plurality of needles when the needle support is reciprocated and means for discharging the straightened needles during the feeding operation.

17. A needle straightening machine including in combination, a movable needle support, means for intermittently rotating said support, means for feeding a plurality of needles to the needle support when being rotated, means for locking said needle support against rotation. means for reciprocating the needle support, devices for straightening a plurality of needles when the needle support is reciprocated, and means for discharging the straightened needles during the feeding operation.

18. In a needle straightening machine, the combination with a movable needle support, of a cam carried thereby, a roller coöperating with said cam. supporting means for said roller, a pawl carried by the needle support and adapted to engage the roller support, and means for operating the said roller and its supporting means alternately in opposite directions.

19. In a needle straightening machine, the combination with a movable needle support, of a cam and coöperating roller mechanism for reciprocating the said needle support and means including a pawl adapted to engage the roller mechanism for rotating the needle support.

20. In a needle straightening machine the combination with a movable needle support, a series of cams and coöperating roller mechanism for reciprocating the said needle support and a series of pawls adapted to engage the roller mechanism when the needle support is moved in one direction.

21. A needle straightening machine including in combination, a needle support, means for rotating said needle support, means for reciprocating the said needle support and means including a reversible clutch mechanism for operating said rotating and reciprocating means.

22. A needle straightening machine, including in combination, a needle support, means for rotating and reciprocating said support and means including an automatic reversible clutch mechanism for operating said rotating and reciprocating means.

23. A needle straightening machine including in combination, a needle support, means for rotating and reciprocating said needle support and an automatic reversible clutch for operating said rotating and reciprocating means, said automatic clutch including connections whereby said rotating and reciprocating means are intermittently operated.

24. A needle straightening machine including in combination, an intermittently rotated and reciprocated needle supporting means, a series of cams for reciprocating the said needle support, a plurality of pawls for rotating said needle support and means for controlling the operation of the aforesaid cams and pawls, said means including a reversible clutch.

25. A needle straightening machine including in combination, a movable needle support, means for reciprocating it, means for rotating it, clutch mechanism for effecting the operation of the rotating means, locking means for the needle support, and means including a lever for operating the clutch member and locking means simultaneously.

26. A needle straightening machine including in combination, needle supporting means, a plurality of straightening devices associated with said needle supporting means, means including a blow wheel for intermittently operating said straightening devices simultaneously, a clutch for said blow wheel, a pawl for disengaging said clutch and means for operating said pawl.

27. A needle straightening machine including in combination, a movable needle support, means for rotating and reciprocating the same, needle straightening devices, means including a blow member for operating said straightening devices simultaneously during the reciprocatory movement of the needle support, a clutch for controlling said blow member, means for disengaging said clutch when the needle support is rotated.

28. A needle straightening machine including in combination, a movable needle support, means for rotating and reciprocating the same, needle straightening devices, means including a blow member for operating said devices simultaneously during the reciprocal movement of the needle support, a clutch for controlling said blow member, a lever for disengaging said clutch when the needle support is rotated and means including a plurality of interconnected levers and pawls for engaging the clutch and operating the blow member.

29 A needle straightening machine including in combination, a needle support, straightening devices including spring actuated hammers associated with said needle support, means including movable slides for adjusting the position of the hammers, and means comprising a movable member for regulating the tension of the spring actuated hammers.

30. A needle straightening machine including in combination, needle crook detecting devices each comprising a spring controlled pivoted lever having a needle contacting end, a pivoted selective blow member connected thereto and a relatively positioned counter-weight for normally positioning the said selective blow member.

31. A multiple needle straightening machine including in combination, a needle supporting means, a plurality of straightening devices, means for adjusting said straightening devices simultaneously, of needle crook detecting devices coöperating with said straightening devices, means for adjusting said needle crook detecting devices, blow receiving members upon which the needles are straightened and means for adjusting said blow receiving members simultaneously.

32. A needle straightening machine including in combination, needle supporting means, means for rotating and reciprocating said support, a needle revolving mechanism comprising an endless belt and means for driving said belt over the shanks of the needles while they are being straightened and means for reciprocating said endless band in unison with the reciprocation of the needle support.

33. A needle straightening machine including in combination, a needle supporting means, straightening hammers, needle crook detecting devices each comprising a pivoted lever and a yieldingly arranged needle contacting finger and means associated with said yieldingly arranged contact finger for relatively fixing the said finger when the needle is being straightened.

34. A needle straightening machine including in combination, a needle support, straightening hammers, needle crook detecting devices each comprising a pivoted lever and a yieldingly arranged needle contacting finger and means including a surface against which the yieldingly arranged contact finger rests when the needle is being straightened.

35. A needle crook detecting device for needle straightening machines comprising a blow controlling member, a pivoted lever, a rocking frame with which one end of said pivoted lever is pivotally connected, and a blow selective device also carried by said rocking frame and adapted to be brought into engagement with the blow controlling member to limit the movement thereof, the opposite end of said pivoted lever being adapted to contact with the blade of the needle.

36. A needle crook detecting device for needle straightening machines comprising a pivoted lever and a positive blow selective device, said blow selective device having a pivotal connection with the lever whereby movement is transmitted to the blow selective device, and said blow selective device having a series of stepped projections adapted to be brought into engagement with the blow controlling member to limit the movement of the latter.

37. A needle crook detecting device for needle straightening machines comprising a pivoted lever, a rocking frame having an arm pivotally connected with the lever and carrying also a blow selective device, said blow selective device having a series of stepped projections adapted to be brought into engagement with the blow controlling member to limit the movement thereof.

38. A needle crook detecting device for needle straightening machines comprising a pivoted lever having one end adapted to contact with the blade of the needle and pivotally connected at the opposite end to a rocking frame, said rocking frame carrying a blow selective device having a series of stepped projections adapted to be brought into engagement in the movement of the lever with the blow controlling member to limit the movement thereof.

39. A needle crook detecting device for needle straightening machines comprising a pivoted lever having one end adapted to contact with the blade of the needle and pivotally connected at the opposite end to a rocking frame, said rocking frame carrying a blow selective device provided with a series of stepped projections adapted to be brought into engagement with the blow controlling member to limit the movement thereof.

40. In a needle straightening machine, the combination with a needle support, of a plurality of simultaneously operated hammers, a hammer controlling lever, and a needle crook detecting device for each of said hammers including a pivotally mounted blow member and a pivoted lever having one end designed to contact with the blade of the needle and the other end adapted to shift the blow member on its pivot toward and away from the hammer controlling lever for limiting the movement thereof.

41. In a needle straightening machine, the combination of a needle support with a plurality of simultaneously operated hammers, a hammer controlling lever and a needle crook detecting device for each of the hammers including a pivotally mounted blow member and a spring finger having one end adapted to contact with the blade of the needle and the other end designed to shift the blow member toward and away from the hammer controlling lever for limiting the movement of the latter.

42. In a needle straightening machine, the combination of a needle support, of a plurality of straightening hammers, a series of members upon which the needles are straightened, and a needle crook detecting device associated with each hammer and straightening member and including a pivotally mounted blow member for determining the strength of the blow delivered to the needle, said blow member having pivotal movement in a plane transverse to that in which each hammer moves.

43. In a needle straightening machine, the combination of a needle support, of a plurality of straightening hammers, a lever for each of said hammers, a needle crook detecting device associated with each hammer comprising a pivotally mounted blow member, a lever having one end designed to contact with the blade of the needle and the other end adapted to shift the said blow member on its pivot toward and away from the hammer lever for limiting the movement thereof, and means including a blow wheel for operating the hammer levers simultaneously.

44. In a needle straightening machine, the combination of a needle support, a plurality of straightening hammers, needle crook detecting devices, each including a pivotally mounted blow controlling member and a sensitive finger having one end designed to contact with the blade of the needle and the other end adapted to shift the blow controlling member on its pivot independently of the said straightening hammer, and means for revolving the needle during the straightening operation.

45. A needle crook detecting device for needle straightening machines comprising a pivoted lever and a positive blow selective device connected to said lever, and having a series of stepped projections adapted to be brought into engagement with the blow controlling member to limit the movement thereof.

46. A needle crook detecting device for needle straightening machines comprising a positive blow selective device provided with a series of stepped projections, and a pivoted lever having one end adapted to contact with the blade of the needle and the other end connected to said blow selective device for moving the aforesaid stepped projections with relation to the crook in the needle.

47. A needle crook detecting device for needle straightening machines comprising a shaft, a positive blow selective device secured to said shaft and provided with a series of stepped projections, a pivoted lever having one end adapted to contact with the blade of the needle and the other end connected to the aforesaid shaft, whereby the stepped projections of the selective blow device are moved with relation to the crooks in the needles.

48. A needle crook detecting device for needle straightening machines comprising a shaft, a positive blow selective device secured to said shaft and having a series of stepped projections, an arm carried by said shaft, a link connected to said arm, and a pivoted lever having one end adapted to contact with the blade of the needle and the other end connected to the aforesaid link.

49. A needle crook detecting device for needle straightening machines comprising a shaft, a positive blow selective device secured to said shaft and having a series of stepped projections, an arm carried by said shaft, a link connected to said arm, a pivoted lever having one end adapted to contact with the blade of the needle and the other end connected to the aforesaid link, and a counter-weight carried by said shaft.

50. In a needle straightening machine, the combination with a hammer, of a hammer lever provided with a projection, and a needle crook detecting device including a positive selective device formed with a series of stepped projections positioned with relation to the aforesaid projection on the hammer lever for determining the strength of the blow delivered by the hammer.

51. In a needle straightening machine, the combination with a hammer, of a hammer lever, a striking block carried by said hammer and provided with a projection, and a needle crook detecting device including a positive blow selective device formed with a series of stepped projections positioned with relation to the projection on the striking block, for determining the strength of the blow delivered by the hammer.

In testimony whereof, I affix my signature in the presence of two witnesses.

ALEXANDER ALTMAN.

Witnesses:
 HELGE MURRAY,
 CLARENCE ROWE.